(12) United States Patent
Saitoh et al.

(10) Patent No.: US 6,950,308 B2
(45) Date of Patent: Sep. 27, 2005

(54) ELECTRO-OPTICAL DEVICE ENCASED IN MOUNTING CASE, PROJECTION DISPLAY APPARATUS, AND MOUNTING CASE

(75) Inventors: Hiromi Saitoh, Chino (JP); Tomoaki Miyashita, Shimosuwa-machi (JP); Hiroyuki Kojima, Suwa (JP)

(73) Assignee: Seiko Epson Corporation, Tokyo (JP)

(*) Notice: Subject to any disclaimer, the term of this patent is extended or adjusted under 35 U.S.C. 154(b) by 98 days.

(21) Appl. No.: 10/722,442

(22) Filed: Nov. 28, 2003

(65) Prior Publication Data

US 2004/0136146 A1 Jul. 15, 2004

(30) Foreign Application Priority Data

Dec. 20, 2002 (JP) ........................................ 2002-370068

(51) Int. Cl.$^7$ .......................... H05K 7/20; G02F 1/1333
(52) U.S. Cl. ........................ 361/704; 361/688; 349/58; 349/161
(58) Field of Search ................................ 361/687, 688, 361/690, 704, 719; 349/58, 59, 161

(56) References Cited

U.S. PATENT DOCUMENTS

| | | | | |
|---|---|---|---|---|
| 5,742,366 A | * | 4/1998 | Imoto ............................ | 349/62 |
| 5,743,611 A | * | 4/1998 | Yamaguchi et al. .......... | 353/31 |
| 5,835,179 A | | 11/1998 | Yamanaka | |
| 5,880,795 A | * | 3/1999 | Nagata et al. ................ | 349/58 |
| 6,056,407 A | | 5/2000 | Iinuma et al. | |
| 6,307,603 B1 | * | 10/2001 | Menard et al. ............... | 349/58 |
| 6,322,217 B1 | * | 11/2001 | Fujimori et al. ............. | 353/31 |
| 6,414,781 B1 | | 7/2002 | Saitoh | |
| 6,633,349 B2 | * | 10/2003 | Fujishiro ...................... | 349/58 |

FOREIGN PATENT DOCUMENTS

| | | |
|---|---|---|
| JP | 03-149521 | 6/1991 |
| JP | 04-125538 | 4/1992 |
| JP | 6-67143 | 3/1994 |
| JP | 6-55134 | 7/1994 |
| JP | 6-265855 | 9/1994 |
| JP | 7-248480 | 9/1995 |
| JP | 10-232629 | 9/1998 |
| JP | 10-254336 | 9/1998 |
| JP | 10-319379 | 12/1998 |
| JP | 11-84350 | 3/1999 |
| JP | 2000-147472 | 5/2000 |
| JP | 2000-180958 | 6/2000 |
| JP | A-2001-195006 | 7/2001 |
| JP | 2001-264882 | 9/2001 |
| JP | 2001-264883 | 9/2001 |
| JP | 2001-318361 | 11/2001 |
| JP | A-2002-107698 | 4/2002 |
| JP | 2002-244214 | 8/2002 |
| JP | 2002-258241 | 9/2002 |
| JP | 2002-296568 | 10/2002 |
| JP | 2004-045680 | 2/2004 |
| WO | WO98/36313 | 8/1998 |

* cited by examiner

*Primary Examiner*—Boris Chervinsky
(74) *Attorney, Agent, or Firm*—Oliff & Berridge, PLC

(57) ABSTRACT

An electro-optical device encased in a mounting case includes an electro-optical device in which projection light from a light source is incident on an image display region; and a mounting case including a plate disposed to face one surface of the electro-optical device and a cover to cover the electro-optical device, the cover having a first abutting portion of abutting against the plate, the mounting case accommodating the electro-optical device by holding at least a portion of a peripheral region located in the circumference of the image display region of the electro-optical device with at least one of the plate and the cover. Further, at least one of a heat transfer path reaching the cover from the electro-optical device through the plate and another heat transfer path reaching the cover from the electro-optical device not through the plate is formed, and the heat transfer path includes a portion in which the electro-optical device area contacts with the cover, directly or indirectly.

29 Claims, 17 Drawing Sheets

F I G. 1 5
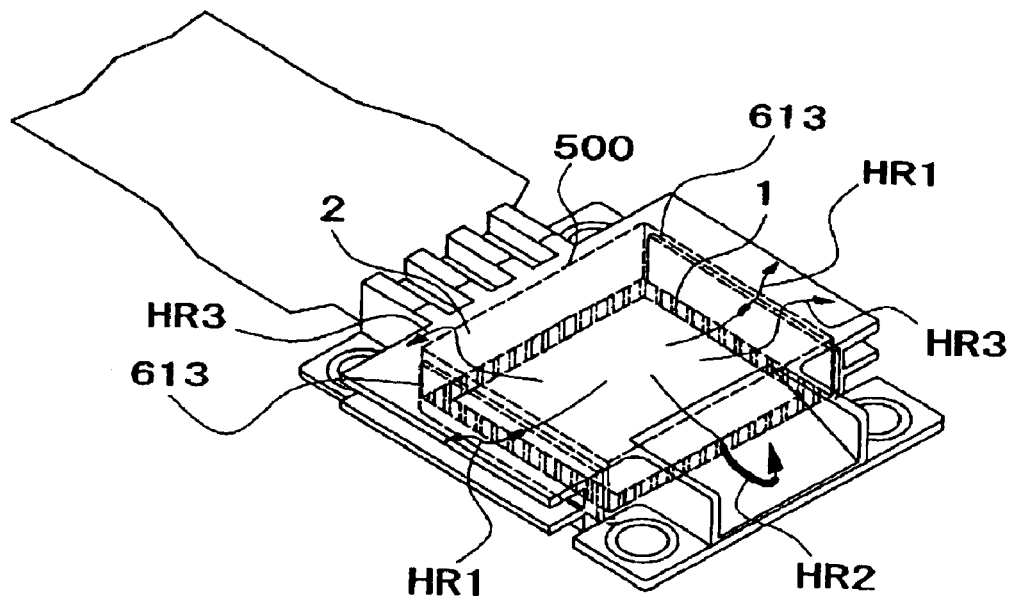

ELECTRO-OPTICAL DEVICE ENCASED IN MOUNTING CASE, PROJECTION DISPLAY APPARATUS, AND MOUNTING CASE

BACKGROUND OF THE INVENTION

1. Field of Invention

The present invention relates to a mounting case to accommodate an electro-optical device, such as a liquid crystal panel, which is used as a light valve of a projection display apparatus, such as a liquid crystal projector, an electro-optical device encased in a mounting case, in which the electro-optical device is accommodated or encased, and a projection display apparatus including the electro-optical device encased in the mounting case.

2. Description of Related Art

In the related art, generally, when a liquid crystal panel is used as a light valve of a liquid crystal projector, the liquid crystal panel is not provided in an exposed state on a console, etc., constituting the liquid crystal projector, but it is accommodated or encased in a suitable mounting case, and then the mounting case including the liquid crystal panel is provided on the console.

Herein, the liquid crystal panel can be easily adhered or mounted to the console by suitable screw holes provided in the mounting case.

In the liquid crystal projector, source light emitted from a light source is projected on the liquid crystal panel in the mounting case as focused light. Light passing through the liquid crystal panel is enlarged and projected on the screen to display images. In such a liquid crystal projector, since the enlarged projection is generally predetermined, relatively intensive light emitted from a light source, such as a metal halide lamp, is used as the source light emitted from a light source.

However, in this construction, first, there is a problem in which the temperature of the liquid crystal panel encased in the mounting case rises. In other words, the rise in temperature causes the rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then the deviation of its transmittance is generated by the so-called hot spots. Thus, the quality of projected images deteriorates.

Techniques for preventing the rise in temperature of the liquid crystal panel include an approach to prevent the rise in temperature of the liquid crystal panel by providing a radiating sheet between the liquid crystal panel and a radiating portion in a liquid crystal display module including the liquid crystal panel and a package to hold and accommodate the liquid crystal panel and having the radiating plate.

In addition, in order to address the problem, other approaches, such as an approach of providing a light shielding film on a substrate located at the side of the liquid crystal panel on which light is incident and an approach of forming the mounting case, in which the liquid crystal panel is held or accommodated, using a light reflective material, have been known.

However, the related art approaches for preventing the rise in temperature of the liquid crystal panel have the following problems. As long as intensive light is emitted from the light source, the problem of the rise in temperature of the liquid crystal panel may occur at any time. Therefore, in order to obtain still higher image quality, more effective measures to prevent the rise in temperature are required, instead of or in addition to the aforementioned approaches.

For example, according to the approach of using the radiating sheet, the heat being accumulated in the liquid crystal panel can be surely radiated effectively. However, assuming that the radiating plate or the radiating sheet is provided to cover the entire surface of the substrate, the approach can be used for a reflective liquid crystal panel, but cannot be used for a transmissive liquid crystal panel.

In addition, according to the approach of reflecting light by the light shielding film and the mounting case, as the areas of the light shielding film and the mounting case increase, the amount of the reflected light increases. Thus, the rise in temperature of the liquid crystal panel can be prevented. However, if the amount of the reflected light increases indiscriminately, the stray light increases in the housing for accommodating the liquid crystal panel in the mounting case. Thus, the quality of images can be deteriorated. In addition, since the increase of the area of the light shielding film causes the reduction of the amount of the light from the source light, which is to be originally incident to and to pass through the liquid crystal panel, the image can be darkened. Thus, it is contrary to the aforementioned purpose in which the intensive light is used in order to display a brighter image. Accordingly, the aforementioned related art approaches do not have a total solution for the above problems.

SUMMARY OF THE INVENTION

The present invention is contrived to address the above problems. The present invention provides an electro-optical device encased in a mounting case capable of effectively suppressing the rise in temperature of the electro-optical device, to which relatively intensive light is incident, and a projection display apparatus including the electro-optical device encased in the mounting case. In addition, the present invention provides a mounting case suitable to mount the electro-optical device.

In order to achieve the above, an electro-optical device encased in a mounting case of an aspect of the present invention includes an electro-optical device in which projection light from a light source is incident on an image display region; and a mounting case including a plate disposed to face one surface of the electro-optical device and a cover to cover the electro-optical device, the cover having a first abutting portion of abutting against the plate, the mounting case accommodating the electro-optical device by holding at least a portion of a peripheral region located in the circumference of the image display region of the electro-optical device with at least one of the plate and the cover. Further, at least one of a heat transfer path reaching the cover from the electro-optical device through the plate and another heat transfer path reaching the cover from the electro-optical device not through the plate is formed, and the heat transfer path includes a portion in which the electro-optical device area contacts with the cover, directly or indirectly.

According to the electro-optical device encased in the mounting case of an aspect of the present invention, the electro-optical device having the image display region, to which the light emitted from the light source is incident, is accommodated into the mounting case including the cover and the plate. The electro-optical device includes, for example, a liquid crystal device or a liquid crystal panel, which is mounted as a light valve of the projection display apparatus. In addition, the mounting case has preferably an additional function, such as a light shielding function to prevent the leakage of light in the peripheral region of the electro-optical device and the influx of the stray light from the peripheral region to the image display region by partially covering at least a portion of the peripheral region of the electro-optical device.

In an aspect of the present invention, particularly, at least one of a heat transfer path reaching the cover from the electro-optical device through the plate and another heat transfer path reaching the cover from the electro-optical device not through the plate is formed, and the heat transfer path includes a portion in which the electro-optical device area contacts with the plate, directly or indirectly. Further, "the heat transfer path" herein may or may not include the first abutting portion.

According to the above structure, the electro-optical device, the plate, the cover or the heat transfer path leading to the cover directly are provided. Therefore, when irradiated light causes the temperatures of the electro-optical device to rise, the heat can be finally released or transferred to the cover. That is, in that case, the plate or the cover functions as a heat sink of the electro-optical device. As a result, it is possible to cool the electro-optical device effectively.

Further, the heat transfer path includes a portion in which the electro-optical device area contacts with the plate, directly or indirectly. That is, the heat is transferred from the electro-optical device to the plate very widely through the area-contacted portion. Therefore, cooling effect of the electro-optical device is realized effectively.

Accordingly, according to an aspect of the present invention, it is possible to reduce or prevent, raising the temperature of the electro-optical device. For example, it is possible to reduce or prevent deterioration of property of liquid crystal as an example of electro-optical materials, or generation of hot spot in the liquid crystal, and it is possible to display high quality image.

In this invention, "area contact" is a concept contrasted with the "point contact". Which state means the area contact or point contact can be determined mainly based on the size of the electro-optical device, the substrate size that constructs the electro-optical device, the peripheral region size, the plate size, or roughness of the plate surface, or the surface precision of the plate.

In an aspect of the present invention, to be area-contacted "directly" means to contact to each other without any interposing materials between the two things. However, it does not mean that things, such as minute dust or dirt, which enter unavoidably during the manufacturing process, does not exist. On the other hand, to be contacted "indirectly" means to provide any interposing material, such as the double coated adhesive tape, the molding material interposed between two things on purpose, as described hereinafter.

Further, as mentioned above, in order to cause the plate to exhibit its duty as the heat sink of the electro-optical device very well, so called fins may be provided on the plate. "The fin" herein is a protruded member which is formed as the plate or as a member separated from the plate, or means a structure which increases the surface of the whole plate. By providing the fin, since heat radiation on the plate can be promoted, the plate can exhibit its duty as the heat sink very well.

In another aspect of the electro-optical device encased in the mounting case according to an aspect of the present invention, the heat transfer path includes a portion in which the electro-optical device area contacts with the cover, directly or indirectly.

According to the above aspect, the heat transfer path includes a portion in which the electro-optical device area contacts with the cover, directly or indirectly. So thus, heat transfers widely to the cover from the electro-optical device, and therefore a cooling effect of the electro-optical device is realized more effectively.

In another aspect of the electro-optical device encased in the mounting case according to the present invention, the cover is made of a material having a higher heat conductivity than the plate, and the electro-optical device is fixed to the plate.

According to the above aspect, it is intended to divide the function of the plate and the cover. So, in one mounting case, it is possible to achieve the harmony between both functions of fixing and cooling of the electro-optical device. That is, in the above aspect, the plate is "disposed so as to face one surface of the electro-optical device". The plate may include a proper fixing device, such as bonding, fitting, screw coupling, or making the plate to be a three-dimensional shape like frame, which substantially matches with the whole or a part of appearance of the electro-optical device. So thus, the plate has mainly function of reducing or preventing dislocation of the position of the electro-optical device in the mounting case. On the other hand, since the cover is made of a material having a higher heat conductivity than the plate, it is promoted to carry heat from the plate by the cover on the heat transfer path. As a result, as it is promoted to carry heat from the electro-optical device by the plate, mainly the cover has function of cooling the electro-optical device, effectively.

If the plate or the cover has both functions of reducing or preventing dislocation of the position of the electro-optical device and cooling the electro-optical device, that is, if ability of the cover, according to the present aspect, is given to the plate, or the contrary structure thereto is adopted, a material having a high heat conductivity has a high heat expansivity, so that the plate or the cover is much transformed due to the heat absorbed therein, and the problem that the fixing function of the electro-optical device cannot be exhibited efficiently is increased. As a result, due to thermal expansion or thermal contraction of the plate or the cover, the problem of dislocating the position of arrangement in the mounting case of the electro-optical device fixed thereto is increased.

As mentioned above, in the above aspect, it is intended to divide the functions of the plate and the cover, so the problem, as mentioned above, does not occur. As a result, since the cover does not mainly take charge of the function of fixing the electro-optical device, the cover may be freely thermally transformed relatively. Since the plate does not mainly take charge of the function of cooling the electro-optical device, it is possible to fix the electro-optical device more safely.

Further, in an aspect of the present invention, the cover also has the function of fixing the electro-optical device a little. That is, if the above problem is avoided, the cover may share the function of fixing the electro-optical device. Similarly, the plate slightly has a function of cooling the electro-optical device. In fact, the plate has shared already the predetermined function with respect to the cooling of the electro-optical device. In the present aspect, since the cover is made of the material having high heat conductivity, the cover takes the lead in cooling the electro-optical device, rather than the plate.

In addition, "the material having high heat conductivity" referred to the present invention specifically includes aluminum, magnesium, copper, or an alloy thereof.

In another aspect of the electro-optical device encased in the mounting case according to an aspect of the present invention, a molding material is interposed between the plate and the electro-optical device, and the heat transfer path includes the molding material.

According to the above aspect, the molding material made of the proper adhesive is interposed between the plate and the electro-optical device. So thus, it can be intended to fix the electro-optical device by the plate.

In another aspect of the electro-optical device, encased in the mounting case, according to the present invention, the plate and the electro-optical device are bonded to each other using a photo-curing resin.

According to the above aspect, the plate and the electro-optical device are bonded to each other using a photo-curing resin. So thus, it can be intended to fix the electro-optical device by the plate.

Further, in the above aspect, although there is no specific limitation about the bonding region of the plate and the electro-optical device, that is, the position of the photo-curing resin, preferably, the adhesive according to the present aspect may be provided "between the side of the electro-optical device and the surface of the plate facing one surface of the electro-optical device". Further, in the above structure, in order to constrain the electro-optical device on the plate uniformly by the photo-curing resin, or to save the amount of used photo-curing resin, it is preferable to provide the photo-curing resin so as to be corresponded to four angles of the electro-optical device. Further, in the structure in that the photo-curing resin is provided so as to correspond to the four angles, heat-transfer promoting device, such as the heat radiation sheet are provided between one surface of the electro-optical device and a surface of the plate facing thereto. According to the last structure, it is possible to realize preferably both of constraint of the electro-optical device on the plate and heat-absorption from the electro-optical device. Furthermore, it is preferable to provide a double coated adhesive tape or a molding material to be described after, instead of the heat transfer promoting device.

In another aspect of the electro-optical device encased in the mounting case according to the present invention, the area-contacted portions are bonded to each other by at least one of a double coated adhesive tape and a molding material in order to bond the plate with the electro optical device.

According to the above aspect, it is possible to firmly fix the plate with the electro-optical device by an adhesive property, which at least one of the double coated adhesive tape and the molding material has. So thus, it is possible to reduce or prevent previously dislocation of the electro-optical device encased in the mounting case effectively. Particularly, when the electro-optical device encased in the mounting case is assembled into the projection display device, such as the liquid projector, it is thought that relatively great tension acts on a flexible connector extending from the electro-optical device. In an aspect of the present invention, it is advantageous that, due to the double coated adhesive tape or the molding material, the dislocation of the electro-optical device in the mounting case does not occur in spite of the relatively great tension.

Further, since the area-contacted portion includes at least one of the double coated adhesive tape or the molding material according to the present aspect, if the double coated adhesive tape or the molding material has proper heat conductivity, heat can be transferred from the electro-optical device to the plate or the cover without delay. Therefore, when the temperature of the electro-optical device rises due to the light incident from the light source, it is possible to carry heat into the plate effectively through the double coated adhesive tape or the molding material.

As explained above, according to the present aspect, it is possible to obtain simultaneously both effects of fixing the electro-optical device in the mounting case and effectively cooling the electro-optical device.

In another aspect of the electro-optical device encased in the mounting case according to the present invention, the at least one of double coated adhesive tape and molding material is made of a material whose heat conductivity is 0.6 W/m·K or more.

According to the above aspect, since the at least one of double coated adhesive tape and molding material is made of a material whose heat conductivity is 0.6 W/m·K or more, the heat transferred to the double coated adhesive tape or the molding material from the electro-optical device is transferred again to the plate quickly. As a result, according to the above aspect, the electro-optical device can be cooled more effectively.

Further, as "the double coated adhesive tape" satisfying the above condition, a double coated adhesive tape including the heat conductive silicon rubber, or a double coated adhesive tape including the heat conductive silicon rubber and adopting the multi-layered structure in which a bonding layer and the layer to be bonded change their materials is used. Otherwise, it is possible to adopt the acrylic-based heat-conductive double coated adhesive tape including metal oxides or metal nitrides, including the acrylic rubber as a main body.

In another aspect of the electro-optical device encased in the mounting case according to the present invention, the plate is made of a plate-shaped member, and includes a rising portion rising toward the cover from the plate-shaped member, and having a second abutting portion abutting against at least a part of the electro-optical device, directly or indirectly, and the area-contacted portion includes the rising portion.

According to the above aspect, since the rising portion includes the second abutting portion abutting against at least a part of the electro-optical device, it is possible to constraint the arrangement position of the electro-optical device in the mounting case somewhat. Therefore, it is possible to avoid deviation of the electro-optical device from the focused point of the incident light beforehand, and thus a high quality image can be displayed.

Further, the area-contacted portion includes the rising portion according to an aspect of the present invention, and the rising portion includes the second abutting portion. And thus, when the temperature of the electro-optical device rises due to the light irradiation, it is possible to carry the heat to the plate through the rising portion or to transfer the heat.

Further, with respect to "the second abutting portion" in the present aspect, that at least a part of the electro-optical device abuts against the second abutting portion of the rising portion "directly" means to abut each other without any interposing material therebetween. But, it does not mean that things such as minute dust or dirty, which enter unavoidably during the manufacturing process, does not exist. On the other hand, to abut "indirectly" means a case of providing any interposing material, such as a molding material interposed therebetween on purpose.

As the concrete feature of "the rising portion" in the present aspect, as described after, assumed are a feature including a bent portion which is formed by bending a part of the plate-shaped member constructing the plate, and a feature including a pillar or wall-shaped member, formed by bonding, fitting, screw coupling on the plate-shaped member.

Further, in general, as the shape, a shape including a part with four corners provided so as to correspond to the four angles of the substrate constructing the electro-optical device or a shape including three or four plate-shaped portions provided so as to correspond to the three or four sides of the electro-optical device, can be considered.

In another aspect of the electro-optical device encased in the mounting case according to the present invention, the rising portion includes a bent portion having a part of the plate-shaped member, which is bent.

According to the above aspect, the rising portion includes the bent portion as a part of the plate-shaped portion. Therefore, first, when the bent portion does not exist in the plate, it is possible to enhance the strength of the plate as compared with a flat plate on which any process is not performed. The reason is that due to existence of the bent portion, the plate is affected by the process hardness somewhat, or the transformed shape which the plate selects is limited (for example, in case of the plate, the transformation is simple, but in case that the bent portion exist, the transformation is not simple). For example, the existence of the bent portion can increase the resisting force against external force pressing the plate.

Therefore, according to the present aspect, it is possible to reduce or prevent the dislocation of the electro-optical device or the dislocation of the mounting case accommodating the electro-optical device or the plate constituting the mounting case, due to the mechanical factor beforehand.

Second, according to the present aspect, in order to form the above rising portion, the separate material or member from the plate-shaped member constituting the plate is not needed. So thus, structure of the rising portion can be realized more simply.

In the above aspect, the plate-shaped member includes a quadrilateral portion in plan view. The bent portion may be formed so that a part of two facing sides among the individual sides constituting the quadrilateral shape includes a portion bent into the inside of the quadrilateral portion.

According to the above structure, if the electro-optical device is provided on the plate-shaped member and between the two facing sides, the sides opposing to each other toward the inside of the quadrilateral shape in the bent portion abut both sides of the electro-optical device, directly or indirectly. It shows the more concrete shape of "the second abutting portion" in an aspect of the present invention. According to such structure, it is possible to enlarge relatively the contacted area between the plate and the electro-optical device in accordance with length of each side. So thus, it is possible to increase the heat transferring efficiency from the latter to the former, and to enhance the function as a heat sink in the plate. As a result, it is possible to realize the cooling of the electro-optical device more effectively. Further, owing to the same reason, that is, enlargement of the contacted area between the plate and the electro-optical device, the electro-optical device is arranged relatively stably on the plate, and the effect of the determination of the position of the electro-optical device by the plate increases compared with the above structure.

Furthermore, in the present structure, though the bent portion is formed in at least "two facing sides among individual sides constructing the quadrilateral shape", in addition to this, the bent portion may be formed at one side of the remaining sides or the remaining sides.

"To include a quadrilateral portion" in the structure means that the shape of the plate-shape member constituting the plate includes a quadrilateral shape not only in the strict sense, for example, square or rectangle, but also in a shape carved therefrom or protruded. As an example of such a shape, a shape in which one side of the rectangle overlaps with another rectangle having a shorter side than the above side can be given. Further, the plate-shaped member having a proper three-dimensional shape by the press process is included therein. In such cases, even though the whole shape is not a quadrilateral shape in the strict sense, it corresponds perfectly to the plate-shaped member including a quadrilateral portion, as mentioned in the present structure. The unlimited transformation structure can be considered, but all of the transformation structure is included in the present structure. The "plate-shaped member" may include ideally "the quadrilateral shape" including "two facing sides".

In another aspect of the electro-optical device encased in the mounting case according to the present invention, the cover includes a wall portion facing a side of the electro-optical device, and the first abutting portion includes an abutting portion between the first facing surface of the rising portion and at least a part of the wall portion.

According to the above aspect, the cover includes the wall portion facing the side of the electro-optical device. The wall portion abuts against the first facing surface of the rising portion as at least a part of the first abutting portion. As a result, the plate abuts against the cover by the rising portion of the former and the wall portion of the latter.

According to the above structure, it is possible to enlarge relatively the contact area between the plate and the electro-optical device. So thus, it is possible to transfer effectively the heat from the former to the latter, and to exhibit much more the function as a heat sink in the cover. As a result, it is possible to realize the cooling of the electro-optical device more effectively.

In the above aspect, the second abutting portion may include an abutting portion between the second facing surface as the rear surface of the first facing surface and at least a part of a side of the electro-optical device.

According to such a structure, in addition to contact of the above wall portion and the first facing surface of the rising portion, the second facing portion of the rising portion to be a rear surface of the first facing surface abuts on at least a part of the side of the electro-optical device on at least a part of the second abutting portion, directly or indirectly.

By doing so, the side of the electro-optical device, the first facing surface of the rising portion, the second facing surface of the rising portion and the wall portion of the cover, are arranged in a section of the electro-optical device encased in the mounting case, in this order from the inner side. Therefore, since the heat from the electro-optical device is transferred more directly to the side of the electro-optical device, the rising portion of a part of the plate, and the cover, the electro-optical device can be cooled more effectively.

Further, according to the above structure, the position of the electro-optical device is restricted by both the rising portion and the wall portion of the cover, so thus, the electro-optical device can reduce the dislocation in the mounting case.

Furthermore, in order to effectively obtain the effect on the above heat transfer, it is preferable to make the distance between the first facing surface and the second facing surface of the rising portion, in other words, the thickness of the rising portion, to be small. In that case, when the rising portion is made of the bent portion, it is preferable to make the thickness of the bent portion substantially to be matched with the thickness of the plate-shaped portion, and to make the plate-shaped portion to be thinner by the use of the lightweight, small sized mounting case. Thus, the above condition can be satisfied easily. Therefore, it is more preferable to adopt the aspect including the bent portion as the rising portion in order to adopt the structure according to the present aspect.

Further, as apparent from the above description, though the side of the electro-optical device, the rising portion and the wall portion of the cover are arranged "in arbitrary section" as mentioned above in this order from the inner side, it is not limited to such a feature. For example, the side of the electro-optical device, the wall portion of the cover, and the rising portion are arranged in the section, in this order from the inner side. But even in this case, the first facing surface of the rising portion can abut against the wall portion, and thus it is possible to satisfy the requirement just aforementioned. However, since the second facing surface of the rising portion is exposed to the outside, it does not satisfy the requirement of the aspect. But in such a structure, inside and rear sides of the wall portion play an important parts in the heat transfer. An aspect of present invention also includes such a structure.

In another aspect of the electro-optical device encased in the mounting case according to the present invention, the rising portion rises at a right angle from the plant-shaped portion.

According to the above aspect, for example, dislocation of the electro-optical device including a rectangular parallelepiped substrate can be prevented more effectively. The reason is that the rising portion grasps the rectangular parallelepiped side more effectively.

In another aspect of the electro-optical device encased in the mounting case according to the present invention, the plate has a coefficient of linear expansion within the predetermined range when the coefficient of linear expansion of the substrate is a standard.

According to the above aspect, the plate has a coefficient of linear expansion within the predetermined range with respect to the coefficient of linear expansion of the substrate as a standard. For example, it is considered that the substrate is made of the silica glass or neoceramic. But in this case, if estimating −30 to 80° C. of the maintained temperature range of the electro-optical device, the respect coefficient of the linear expansion is about 0.3 to $0.6 \times 10^{-6}/°$ C. (silica glass), about −0.85 to $−0.65 \times 10^{-6}/°$ C. (neoceramic). Therefore, in an aspect of the present invention, the coefficient of the linear expansion of a material constituting the plate is within the predetermined range. "The predetermined range" herein means the range of the coefficient of linear expansion, which does not cause the dislocation of the electro-optical device in the mounting case. More concretely, it means that the substrate and the plate have almost same coefficient of the linear expansion.

Therefore, according to an aspect of the present invention, as long as the plate and the electro-optical device which abuts against at least a part of the plate is in the same thermal atmosphere, they expand and contract equally. As a result, first, it is possible to avoid compressing the electro-optical device by the plate that contracts largely as it is assumed that the coefficient of linear expansion of the plate is higher than that of the substrate and the temperature of the periphery thereof is low. Further, second, it is possible to avoid dislocation of the arrangement position of the electro-optical device from the plate, as it is assumed that the periphery temperature is high.

Particularly, the plate according to an aspect of the present invention is to constitute a part of the "heat transfer path" as mentioned above, and to function as the heat sink with respect to the electro-optical device. So thus the rise in temperature of the plate is substantially inevitable. However, it must be avoided to cause dislocation of the electro-optical device in the mounting case, due to the large thermal expansion of the plate.

Therefore, in the present aspect, since the structure as described above is adopted, the above situation can be avoided.

As mentioned above, in the present aspect, it is possible to reduce or prevent generation of irregular color on the image by the compressive force on the electro-optical device in a low temperature environment and to reduce or prevent generation of dislocation of the electro-optical device in a the high temperature environment.

In another aspect of the electro-optical device encased in the mounting case according to the present invention, the predetermined range is $\pm 5 \times 10^{-6}/°$ C.

According to the present aspect, relation between the coefficients of the linear expansion of the plate and the substrate is set properly, so thus the aforementioned effect can be given more effectively. That is, since it is easy for the plate to contract or expand with respect to the substrate beyond the above range, irregular color on the image or dislocation of the electro-optical device is easily generated. For example, according to the research of this inventor, if an aluminum alloy having about 20 to $25 \times 10^{-6}/°$ C. of coefficient of the linear expansion is selected as a material forming the plate, and a silica glass alloy having the aforementioned coefficient of the linear expansion is selected as a material forming the substrate, it is confirmed that the aforementioned problem occurs. In that case, if the coefficient of the linear expansion of the former is a standard, the coefficient of the linear expansion of the latter is large by about 15 to $20 \times 10^{-6}/°$ C.

Further, as a material satisfying the condition according to the present aspect, a copper and tungsten alloy (Cu—W alloy) or ceramic material including alumina ($Al_2O_3$) and silica ($SiO_2$) can be used in addition to "an alloy including at least iron and nickel" to be described after.

Further, it is preferable to limit the predetermined range to $\pm 2.5 \times 10^{-6}/°$ C. based on the coefficients of linear expansion of the above various alloy.

In another aspect of the electro-optical device encased in the mounting case according to the present invention, the plate is made of an alloy including at least iron and nickel.

According to the above aspect, the plate is made of an alloy including at least iron and nickel, more concretely, invar alloy, such as 36Ni—Fe alloy, 42Ni—Fe alloy, Covar alloy (trademark, for example, 32Ni—5Co—Fe alloy, 29Ni—17Co—Fe alloy). Among these, the coefficient of the linear expansion of the 36Ni—Fe alloy is about $1.2 \times 10^{-6}/°$ C., the coefficient of the linear expansion of the 32Ni—5Co—Fe alloy is about $0.1 \times 10^{-6}/°$ C., and the coefficient of the linear expansion of the 29Ni—17Co—Fe alloy is about $5.0 \times 10^{-6}/°$ C. Therefore, if the plate is made of a material having relatively low coefficient of linear expansion, the aforementioned effect can be given further effectively.

In another aspect of the electro-optical device encased in the mounting case according to the present invention, the substrate has at least one of a pair of substrates interposing an electro-optical material and dustproof substrates provided on the pair of the substrates not facing to the electro-optical material.

According to the above aspect, the electro-optical device may include a dustproof substrate in addition to a pair of substrates interposing an electro-optical material, such as liquid crystal, for example, TFT array substrate, on which TFTs as a switching element are arranged in a matrix shape, and a counter substrate. The dustproof substrate reduces or prevents dirt or dust around the electro-optical device from being directly attached on the surface of the electro-optical device. Therefore, it is possible to effectively remove a defect that a figure of dirt or dust appears on the magnified projection image. Since the dustproof substrate has the predetermined thickness, the dustproof substrate has a defocusing function to deviate the focus of the source light or the vicinity thereof from a location where dirt or dust exists, that is, from the surface of the dustproof substrate.

In the present aspect, particularly, the substrate is at least one of the pair of substrates and the dustproof substrate. Therefore, when the dustproof substrate contact with the plate directly, the coefficient of the linear expansion of the dustproof substrate is an essential factor in generation of the aforementioned problems. The reason is that in case of formation, such as the thermal contraction or expansion of the plate, direct influence on the above dustproof substrate is considered. Therefore, in the present aspect, the above dustproof substrate is used as the above substrate. As a result, in the above case, since the coefficient of the linear expansion of the dustproof substrate and the coefficient of the linear expansion of the plate are controlled previously to be within the predetermined range, it is possible to prevent generation of the above problems.

In another aspect of the electro-optical device encased in the mounting case according to the present invention, the cover has surface-area increasing portion increasing the surface area.

According to the above aspect, the surface area of the cover is increased by the surface area increasing portion, so thus, the radiation ability, or cooling ability of the cover is enhanced. Therefore, it is possible to almost maintain the condition of the cooled cover, and the electro-optical device is cooled very effectively.

Particularly, the electro-optical device encased in the mounting case according to the present invention includes the heat transfer path, and the heat on the heat transfer path flows into the electro-optical device, the plate, and the cover. Thus the portion where the heat is finally accumulated is the cover. In such a construction of the present invention, the surface area increasing portion is provided on the cover. According to the above construction, the cover is maintained in a proper cooled state, so thus, the cover can exhibit sufficiently a function as last place of "the heat transfer path", that is, a function as a heat sink of the electro-optical device.

In another aspect of the electro-optical device encased in the mounting case according to the present invention, the surface area increasing portion includes at least one of a fin formed so as to protrude from the surface of the cover and a dimple formed so as to form a concave portion on the cover.

According to the aspect, the surface area of the cover can be relatively easily increased.

In addition, "the fins" described in the aspect may be formed by processes, such as a cutting process, a forging process, a pressing process, an injection molding process, or a casting process when the cover main body is formed or thereafter.

In addition, the difference between the "dimple" and "the small fin" is determined whether they are protruded or concaved from "the surface of the cover" as a reference plane.

In some cases, "the dimple" referred in the aspect may have a property that "it never interrupts the flow of the cooling air blown to the electro-optical device encased in the mounting case." It can be understood from the aforementioned point of view that the small fins may slightly interrupt the flow of the cooling air a little. And then, the difference between the dimple and the small fin may be considered from the above point of view.

In addition, in the aspect, "to form a concave" does not only mean that a process of "forming the concave" is actually performed when forming the dimple on the surface of the cover. In the method of forming the dimple, like the method of forming fins, the dimples are formed by processes, such as a cutting process, a forging process, a pressing process, an injection molding process, or a casting process when the cover main body is formed or thereafter.

In another aspect of the electro-optical device encased in the mounting case of the present invention, the fins are formed to follow the direction of the flow of cooling air, which is blown to the electro-optical device encased in the mounting case.

According to the aspect, since the fins are provided to follow the direction of the flow of cooling air blown to the electro-optical device encased in the mounting case, the cooling effect on the cover by the fins can be more effectively enhanced.

In other words, if the fins are provided to interrupt the flow of cooling air, it is difficult for the cooling air to be blown beyond the fins, so that the cover cannot effectively cool. However, if the fins are provided to follow the direction of the flow of cooling air, the fins do not interrupt the flow of cooling air, so that the cooling air can be blown over the entire cover uniformly. Thus, according to the aspect, the cooling effect on the cover can be effectively enhanced.

In addition, in the aspect, the construction that "the fins are provided to follow the direction of the flow of cooling air" specifically includes the following cases. For example, the first case is that, when the cooling air flows in a straight direction around the cover, the fins are provided to follow the direction of the flow of cooling air. The second case is that, when the cooling air flows in whirls around the cover, the fins are provided to change their providing directions according to the locations of the fins provided on the cover. In addition to the cases, the construction includes another case that, even if the cooling air flows in irregular directions around the electro-optical device in the mounting case, the fins are provided to change their directions so as to follow all or a portion of the directions of irregular flow according to the locations of the fins provided on the cover.

In another aspect of the electro-optical device encased in the mounting case of the present invention, the fins includes a first column of fins and a second column of fins extended in parallel to the first column of fins, and a gap between the first column of fins and the second column of fins is 1 mm or more.

According to the aspect, the fins include the first column of fins and the second column of fins. Herein, the fins extended in a long-straight shape are considered as "the first column of fins" and "the second column of fins".

In addition, in the aspect, the gap between the two columns of fins is 1 mm or more. In this manner, the cooling air supplied to the electro-optical device encased in the mounting case can be supplied between the two columns of fins uniformly and naturally.

In particular, assuming that the electro-optical device encased in the mounting case of an aspect of the present invention is mounted to a projection display apparatus, it may be difficult when the electro-optical device encased in the mounting case and a cooling fan individually provided to the projection display apparatus are provided with a long distance therebetween, or are arranged to be opposite to each other, since additional components are provided for the projection display apparatus. In this case, it is considered that only the cooling air having a low static pressure and a low volume is blown to the electro-optical device encased in the mounting case.

In the aspect, since the gap between the two columns of fins is set to a relatively long distance of 1 mm or more, the cooling air having a low static pressure and a low air volume can be supplied between the two columns of fins. By doing so, since the surface area of the fins, which is exposed to the cooling air is increased, the characteristics on the heat dissipation of the fins can be more enhanced.

Therefore, according to the aspect, it is possible to further enhance the heat radiating capability of the entire cover.

In another aspect of the electro-optical device encased in the mounting case, the cover includes a cover main body accommodating the electro-optical device and a cooling air introducing portion extended from or added to the cover main body, and the cooling air introducing portion includes a cooling air scattering prevention portion causing the cooling air sent toward the electro-optical device encased in the mounting case to flow to the cover main body.

According to the above aspect, the cover includes the cover main body and the cooling air introducing portion, the cooling air introducing portion includes the cooling air scattering prevention portion to cause the cooling air sent toward the electro-optical device encased in the mounting case to flow to the cover main body. Thus, it is possible to increase the heat radiating capability of the cover, and thus to effectively cool the electro-optical device. By the presence of the cooling air scattering prevent portion, the cooling air which is sent to the electro-optical device encased in the mounting case flows into the cover main body accommodating the electro-optical device. Further, it means that cooling of the cover is realized effectively, so the cover exhibits the function as the aforementioned heat sink more effectively.

Specifically, in an electro-optical device encased in a mounting case according to an aspect of the present invention, a heat transfer path is formed and a heat flow in the heat transfer path is realized typically toward an electro-optical device, a plate, and a cover, so that the heat is finally accumulated at the cover. On the assumption of such a configuration of the present invention, in the present aspect, a cooling air scattering prevention portion, etc. is provided at the cover. In this regard, as mentioned above, the cover is kept to a very properly cooled state, such that the cover can function enough as a final place of the "heat transfer path", i.e., a heat sink for the electro-optical device.

Further, the cooling air introducing portion is "extendedly provided" from the cover main body, which corresponds to a case where the two are integrally constructed and the cooling air introducing portion is formed as an extension of the cover main body. In addition, the cooling air introducing portion is "additionally provided" to the cover main body, which corresponds to a case where the two are separately constructed and then the cooling air introducing portion is separately mounted to the cover main body.

In another aspect of an electro-optical device encased in a mounting case of the present invention, the cooling air scattering prevention portion includes a baffle plate.

According to such an aspect, the cooling air scattering prevention portion includes a baffle plate. Herein, the baffle plate is capable of preventing a portion of the cooling air flow. The cooling air is transferred to the electro-optical device encased in a mounting case, and then guided to the cover main body.

In the present aspect, the cooling air is much efficiently guided to the cover main body by means of the baffle plate, such that the electro-optical device itself or the cover can be much efficiently cooled down.

In another aspect of an electro-optical device encased in a mounting case of the present invention, the cooling air introducing portion includes a slope portion having a pointed shape, a tip thereof opposing to the flow direction of the cooling air, such that the cooling air scattering prevention portion includes the slope portion.

According to such aspect, the cooling air scattering prevention portion includes the slope portion. Herein, as explained above, the slope portion is a part having a pointed shape, a tip thereof opposing to the flow direction of the cooling air. With such slope, typically, it may be presented that the cooling air arrives at the tip, and then, jumps up and runs down a surface constituting the slope, and thus flows through the slope.

Herein, when it is assumed that such a tip or the slope portion does not exist, for example, a member having a block shape exist in place of the slope portion, the flow of the cooling air is partially prevented due to the block shaped member. Then the flow of the prevented cooling air proceeds along a surface of the block shaped member. Thus, it is impossible to guide the cooling air to the cover main body.

As described above, with "slope portion" in the present aspect, a function of the cooling air scattering prevention portion is greatly enhanced, such that the electro-optical device itself or the cover can be much efficiently cooled down.

Further, a notion of the "pointed shape" in the present aspect includes a tapered shape, a wedge shape, a streamline shape, etc.

In another aspect of an electro-optical device encased in a mounting case of the present invention, the baffle plate is formed to surround the surface constituting the slope portion.

According to an such aspect, the baffle plate is formed to surround the surface constituting the slope portion. Herein, the "surface constituting the slope portion" corresponds to a surface to run up and down, as mentioned above, when the cooling air runs up and down. Then, in the present aspect, the baffle plate is formed to surround the surface.

That is, according to the present aspect, as mentioned above, it is possible to generate a case where the cooling air arriving at the tip runs up and down the surface, more frequently. Thus, the cooling air is much efficiently transferred to the cover main body.

In addition, the "surround" in the present aspect includes various specific shapes depending on a specific shape of the baffle plate or a combination with a specific shape of the slope portion. For example, in case the slope portion has a triangular prism shape, i.e., a kind of a tapered shape, it can be thought an aspect where a quadrilateral shape, which can be attached to both bottom surfaces of the triangular prism shape, may correspond to the "baffle plate". In such case, if the area of the quadrilateral shape is bigger than that of the bottom surface, it is possible to know whether surplus portion of the quadrilateral is erected to be perpendicular to side of the triangular prism or not. Herein, the "surface constituting the slope portion" is surrounded by both surplus portions of the quadrilateral shape. Further, in addition to such an aspect, if another plate ("baffle plate") is prepared to bridge between plates of the quadrilateral shape, which can be attached to the both bottom surfaces, the plate and the plate of the quadrilateral shape have a shape to certainly surround the side of the triangular prism. The "surround" of the present aspect includes such shapes.

In order to address the above problems, a mounting case of an aspect of the present invention includes a plate disposed to face one surface of an electro-optical device in which the light emitted from a light source is incident on an image display region; and a cover to cover the electro-optical device, the cover having a first portion of abutting against the plate, wherein the mounting case accommodates the electro-optical device by holding at least a portion of the peripheral region located at the circumference of the image display region of the electro-optical device with at least one of the plate and the cover, and wherein at least a heat transfer path from the electro-optical device to the cover through the plate is provided, and the heat transfer path includes a portion in which the electro-optical device area contacts with the plate, directly or indirectly.

According to the mounting case of an aspect of the present invention, it is possible to provide a mounting case suitable for the electro-optical device encased in the mounting case of an aspect of the present invention.

In an aspect of the mounting case of the present invention, the cover is made of a material having higher heat conductivity than the plate, the electro-optical device is fixed to the plate.

According to the mounting case of an aspect of the present invention, it is possible to provide a mounting case suitable for the electro-optical device encased in the mounting case of an aspect of the present invention.

To address the above problems, a projection display device of an aspect of the present invention includes an electro-optical device encased in a mounting case, the light source, an optical system to introduce the projection light into the electro-optical device, and a projection optical system to project the projection light emitted from the electro-optical device.

According to the projection display device of an aspect of the present invention, because a heat transfer path including an area-contacted portion of the plate and the electro-optical device is prepared with the electro-optical device encased in a mounting case according to an aspect of the present invention, and the electro-optical device can be cooled effectively, it is possible to display rather high quality image.

The operations and other advantages of the present invention will be apparent from the exemplary embodiments described later.

BRIEF DESCRIPTION OF THE DRAWINGS

FIG. 15 is a perspective view of the electro-optical device encased in the mounting case according to an exemplary embodiment of the present invention and illustrates the flow of heat from the electro-optical device to the cover in the electro-optical device encased in the mounting case (heat transfer path);

DETAILED DESCRIPTION OF PREFERRED EMBODIMENTS

Now, exemplary embodiments of the present invention will be described with reference to the accompanying figures.

An Exemplary Embodiment of a Projection Liquid Crystal Apparatus

First, with reference to FIG. 1, an exemplary embodiment of a projection liquid crystal apparatus according to the present invention will be described on the basis of an optical system, which is assembled into an optical unit. The projection display apparatus of the exemplary embodiment is constructed as a multi-plate color projector composed of three liquid crystal light valves, which is an example of an electro-optical device cased in a mounting case.

Figure 1:
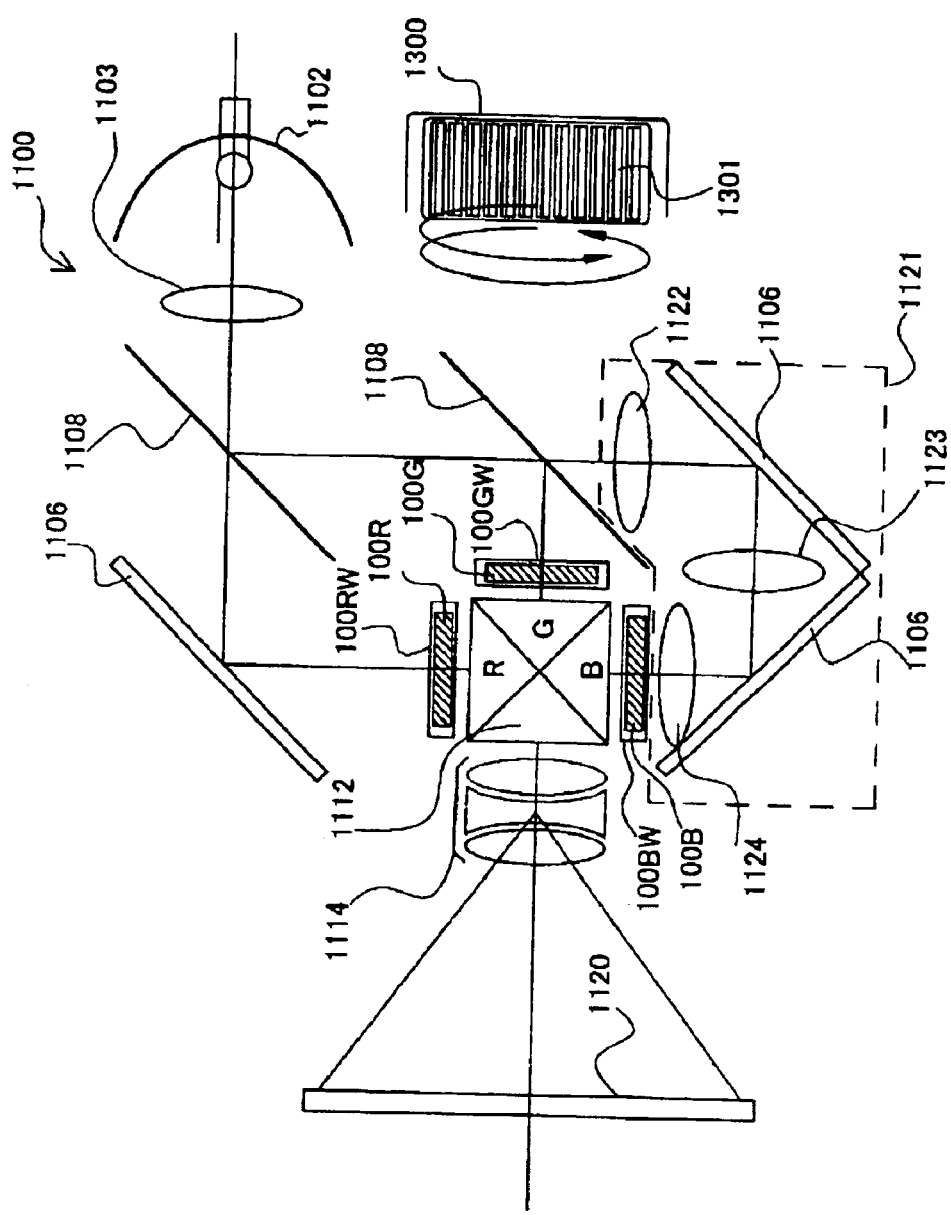
FIG. 1 is a plan view illustrating an exemplary embodiment of a projection liquid crystal apparatus according to the present invention.

In FIG. 1, a liquid crystal projector 1100, an example of the multi-plate color projector in the exemplary embodiment, is a projector that utilizes three liquid crystal light valves having electro-optical devices in which driving circuits are mounted on TFT array substrates as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B, by three mirrors 1106 and two dichroic mirrors 1108. The light components are guided into the light valves 100R, 100G, and 100B corresponding to the colors. In particular, the B light component is guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are again synthesized by a dichroic prism 1112 and then projected onto the screen 1120 as a color image through a projection lens 1114.

An active matrix driving liquid crystal apparatus, in which TFTs are used as switching devices, is used as the light valves 100R, 100G, and 100B of the exemplary embodiment. The light valves 100R, 100G, and 100B are composed as the electro-optical devices cased in the mounting cases as described later in detail.

Further, the liquid crystal projector 1100, as shown in FIG. 1, is provided with a fan 1300 to send cooling air to the light valves 100R, 100G, and 100B. The fan 1300 includes a substantially cylindrical member having a plurality of blades 1301 at the side thereof, and the blades 1301 generate wind by rotating the cylindrical member about its axis. The wind generated by the fan 1300 in accordance with such a principle flows in whirls as shown in FIG. 1.

The wind is supplied to the respective light valves 100R, 100G, and 100B through air passage not shown in FIG. 1, and is blown from respective outlets 100RW, 100GW, and 100BW provided near the light valves 100R, 100G, and 100B to the light valves 100R, 100G, and 100B.

If the fan 1300 as described above is used, it is possible to obtain an advantage that the wind is easily supplied to narrow spaces around the light valves 100R, 100G, and 100B because the wind has high static pressure.

In the aforementioned construction, the light emitted from the lamp unit 1102, which is an intensive light source, raises the temperatures of the light valves 100R, 100G, and 100B. At that time, if the temperatures rise excessively, the liquid crystal constituting the light valves 100R, 100G, and 100B may be deteriorated, or hot spots generated by the partial heating of a portion of the liquid crystal panel due to the unevenness of light emitted from the light source cause the deviation of its transmittance. For this reason, particularly, in the exemplary embodiment, mounting cases capable of cooling the electro-optical devices are provided to the respective light valves 100R, 100G, and 100B as described later. Therefore, it is possible to effectively suppress the temperature rise of the light valves 100R, 100G, and 100B as described later.

In the exemplary embodiment, it is preferable that a cooling device including a circulating unit to circulate a coolant through the surrounding spaces of the light valves 100R, 100G, and 100B should be provided within a housing of the liquid crystal projector 1100. In this way, it is possible to further efficiently radiate heat from the electro-optical device encased in the mounting case having a heat radiating function as described later.

An Exemplary Embodiment of an Electro-Optical Device

Figure 2:
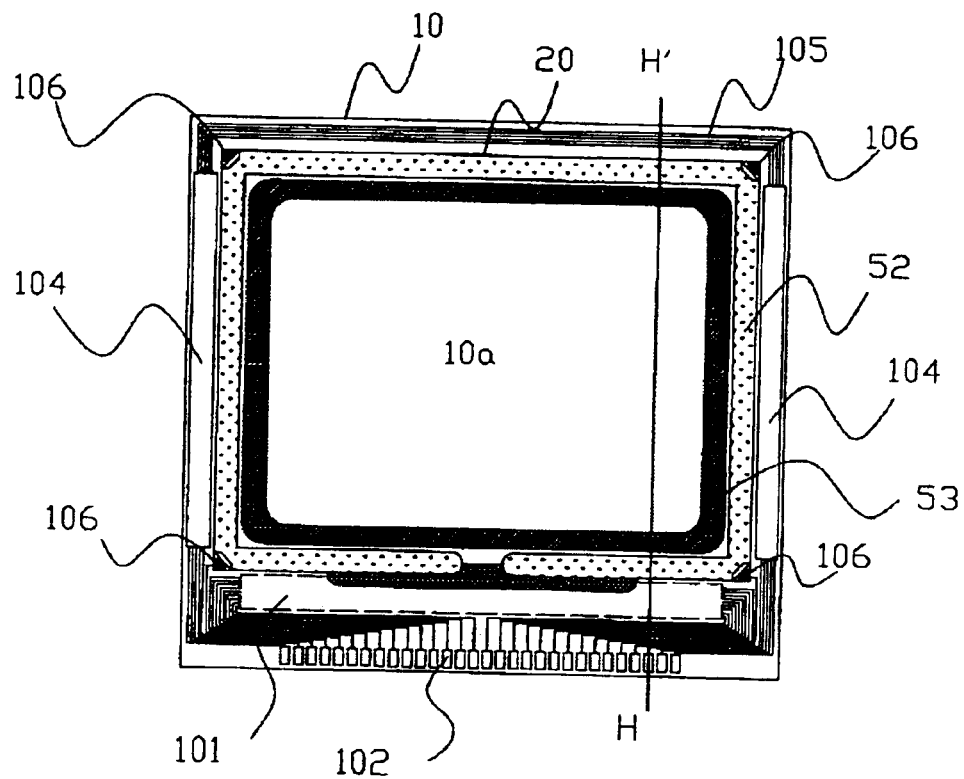
FIG. 2 is a plan view illustrating an exemplary embodiment of an electro-optical device according to the present invention.
Figure 3:
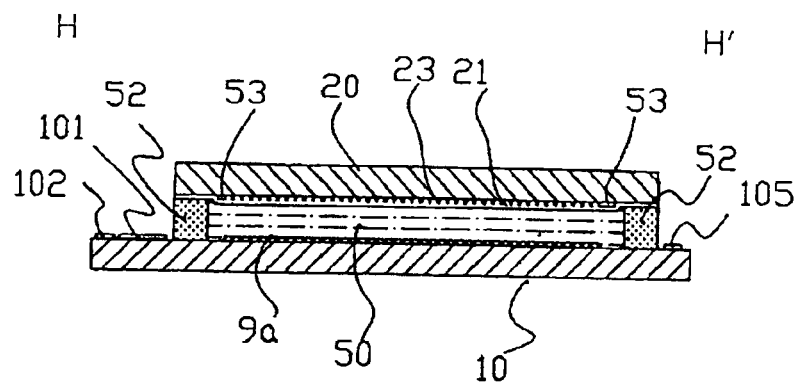
FIG. 3 is a cross-sectional view taken along the plane H–H' shown in FIG. 2.

Next, the overall construction of an electro-optical device according to an exemplary embodiment of the present invention will be described with reference to FIGS. 2 and 3. Herein, a driving circuit built-in TFT active matrix driving liquid crystal device is illustrated as an example of an electro-optical device. The electro-optical device according to the exemplary embodiment is used as liquid light valves 100R, 100G, and 100B of the aforementioned liquid crystal projector 1100. Herein, FIG. 2 is a plan view of the electro-optical device and illustrates a TFT array substrate and constructional components provided thereon, as seen from the counter substrate. FIG. 3 is a cross-sectional view taken along the plane H–H' shown in FIG. 2.

Referring to FIGS. 2 and 3, in the electro-optical device according to the exemplary embodiment, the TFT array substrate 10 is disposed to face the counter substrate 20. A liquid crystal layer 50 is interposed and sealed between the TFT array substrate 10 and the counter substrate 20. The TFT array substrate 10 and the counter substrate 20 are bonded to each other by a seal member 52 disposed at a seal region which is located around an image display region 10a.

The seal member 52 for bonding both substrates is made of, for example, ultraviolet curable resin, thermosetting resin, and the like, which are applied on the TFT array substrate 10 and then cured by ultra-violet irradiation or heating in manufacturing processes. In addition, spacers made of a material, such as glass fiber or glass bead, are dispersed in the seal member 52 to keep the gap between the TFT array substrate 10 and the counter substrate 20 (the gap between the substrates) at a predetermined distance. That is, the electro-optical device of the exemplary embodiment is used for a light valve of the projector as a small-sized device and is suitable to display enlarged images.

A frame light-shielding film 53 to define a frame region of the image display region 10a is provided at the counter substrate 20 parallel to the inner side of the seal region where the seal member 52 is disposed. All or a portion of the frame light-shielding film 53 may be provided at the TFT array substrate 10 as a built-in light-shielding film.

In the peripheral region located at the outer side of the seal region, where the seal member 52 is disposed, of a region extending to the circumference of the image display region, a data line driving circuit 101 and an external circuit connection terminal 102 are provided along one side of the TFT array substrate 10, and scanning line driving circuits 104 are provided along two sides adjacent to the one side. Furthermore, a plurality of wiring lines 105 to connect the scanning line driving circuits 104 provided along two sides of the image display region 10a are provided at the remaining side of the TFT array substrate 10. As shown in FIG. 2, upper and lower conducting members 106 to serve as upper and lower conduction terminals between the two substrates are disposed at four corners of the counter substrate 20. On the other hands, on the TFT array substrate 10, the upper and lower conduction terminals are provided at the regions opposite to the corners. Through these members, the electrical conduction is made between the TFT array substrate 10 and the counter substrate 20.

In FIG. 3, TFTs for pixel switching and wiring lines, such as scanning lines and data lines are formed on the TFT array substrate 10, and then, alignment layers are formed on pixel electrode 9a. On the other hand, on the counter substrate 20, a counter electrode 21 and a light shielding films 23 in a lattice or stripe shape are provided, and in addition, an alignment layer is formed on the uppermost portion thereof. A liquid crystal layer 50, which are made of, for example, one kind of nematic liquid crystal or a mixture of plural kinds of nematic liquid crystal, take a predetermined alignment state between a pair of alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined voltage level to a plurality of data lines prior to the image signals, a test circuit to test the quality and defects of the electro-optical device during the manufacturing process or at the time of shipment, and the like may be formed on the TFT array substrate 10 shown in FIGS. 2 and 3.

When the electro-optical device as constructed above is operated, intensive light is irradiated from the upper side of FIG. 3. In this way, the temperature of the electro-optical device rises by the heating due to the light absorption in the counter substrate 20, the liquid crystal layer 50, and the TFT array substrate 10, etc. The temperature rising facilitates the deterioration of the liquid crystal layers 50 and cause the deterioration of the quality of the display image.

Therefore, the temperature rising can be efficiently suppressed by an electro-optical device encased in the mounting case of the exemplary embodiment described below.

An Electro-Optical Device Encased in a Mounting Case

Next, an electro-optical device encased in the mounting case according to the exemplary embodiment of the present invention will be described with reference to FIGS. 4 to 14.

Figure 4:
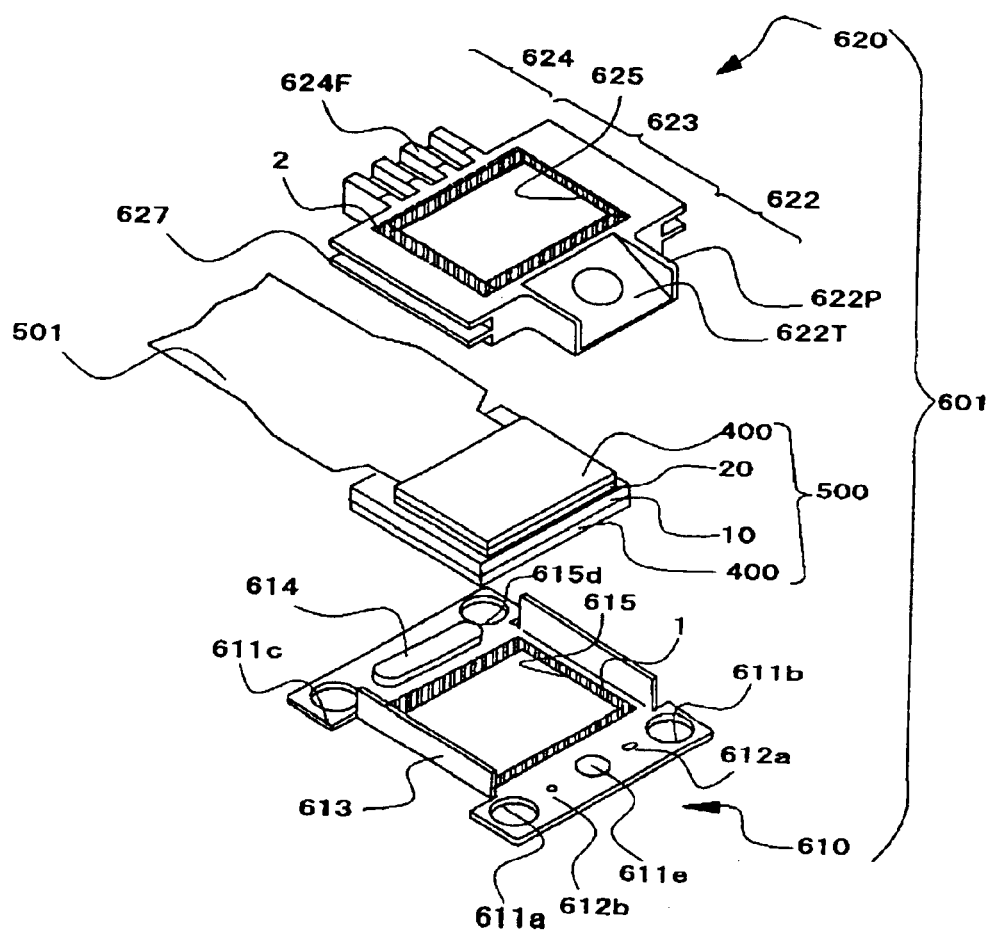
FIG. 4 is an exploded perspective view illustrating an electro-optical device together with a mounting case according to an exemplary embodiment of the present invention.
Figure 5:
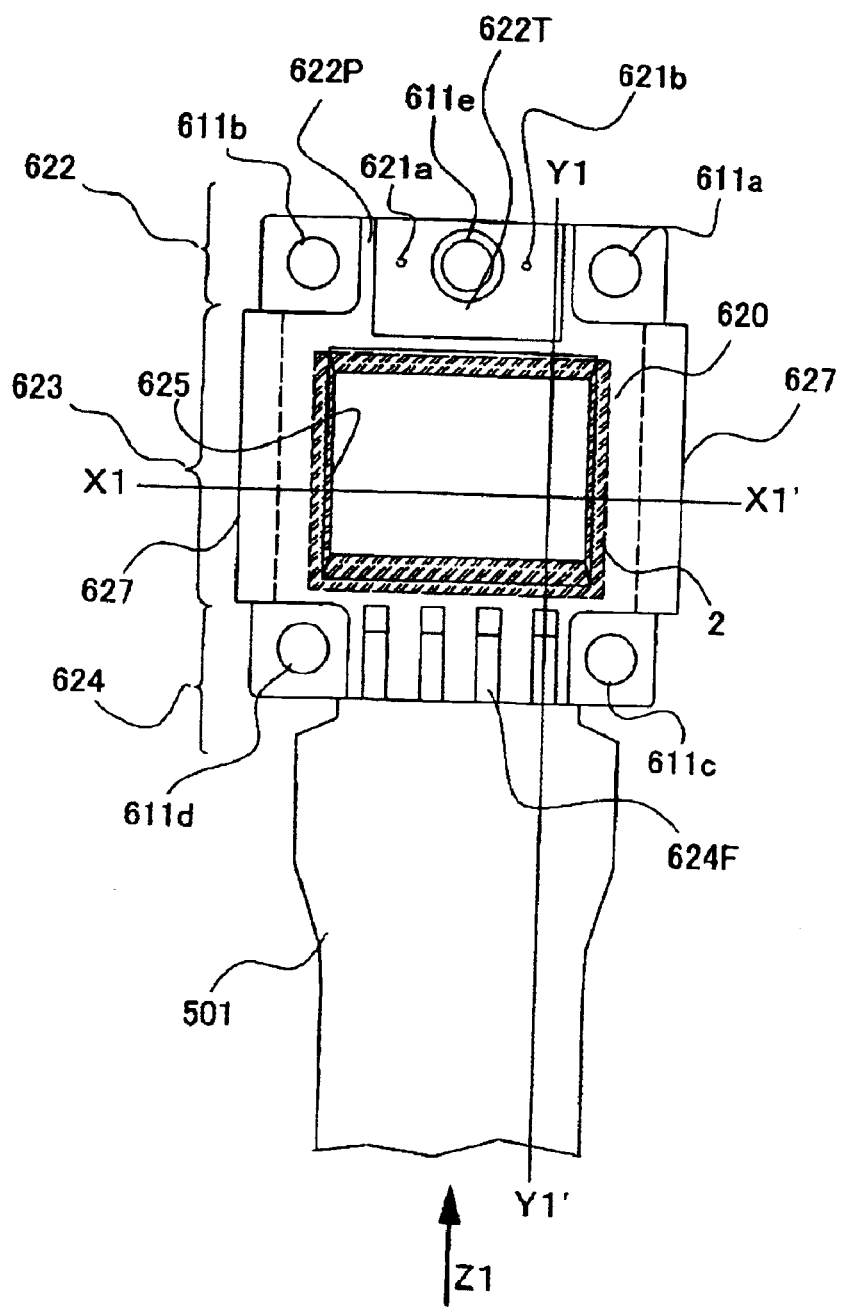
FIG. 5 is a front view of an electro-optical device encased in the mounting case according to an exemplary embodiment of the present invention.
Figure 6:
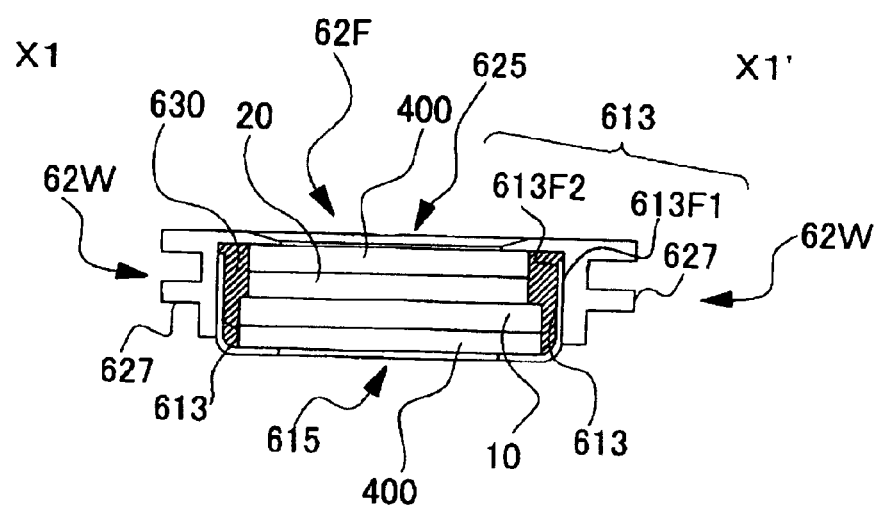
FIG. 6 is a cross-sectional view taken along the plane X1–X1' shown in FIG. 5.
Figure 7:
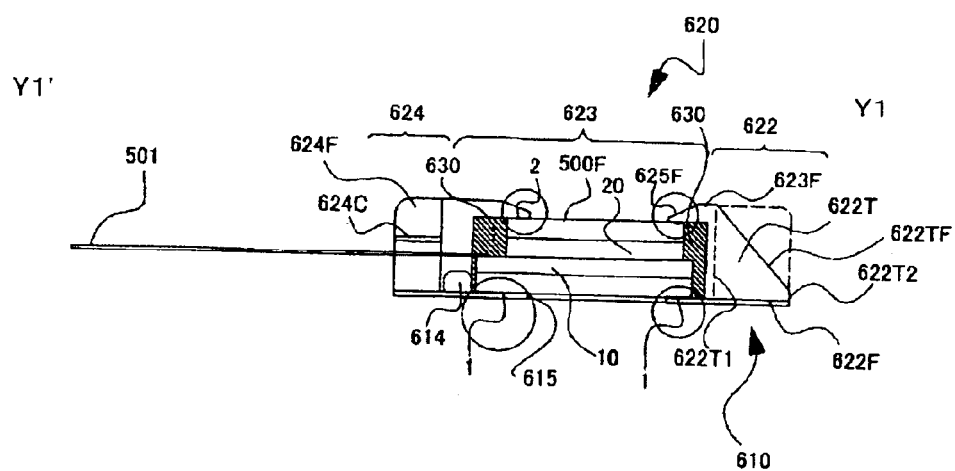
FIG. 7 is a cross-sectional view taken along the plane Y1–Y1' shown in FIG. 5.
Figure 8:
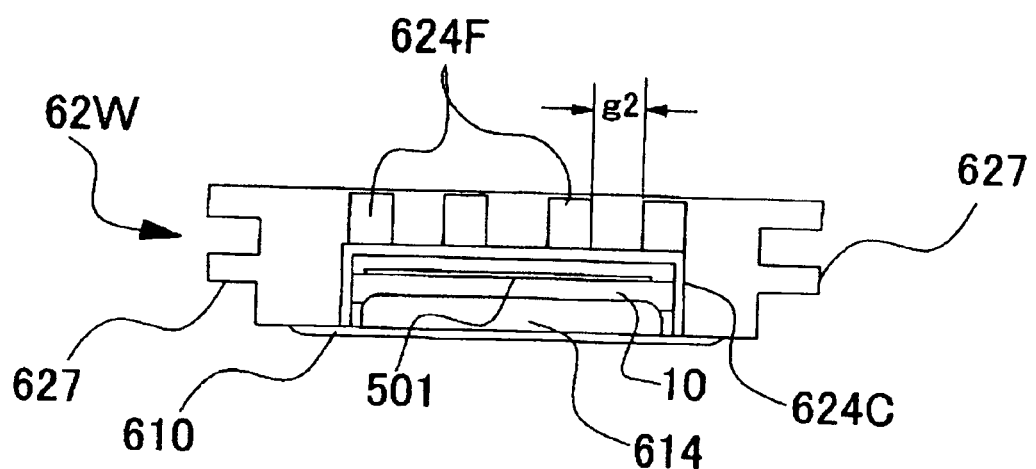
FIG. 8 is a back view shown from the direction of Z1 shown in FIG. 5.
Figure 9:
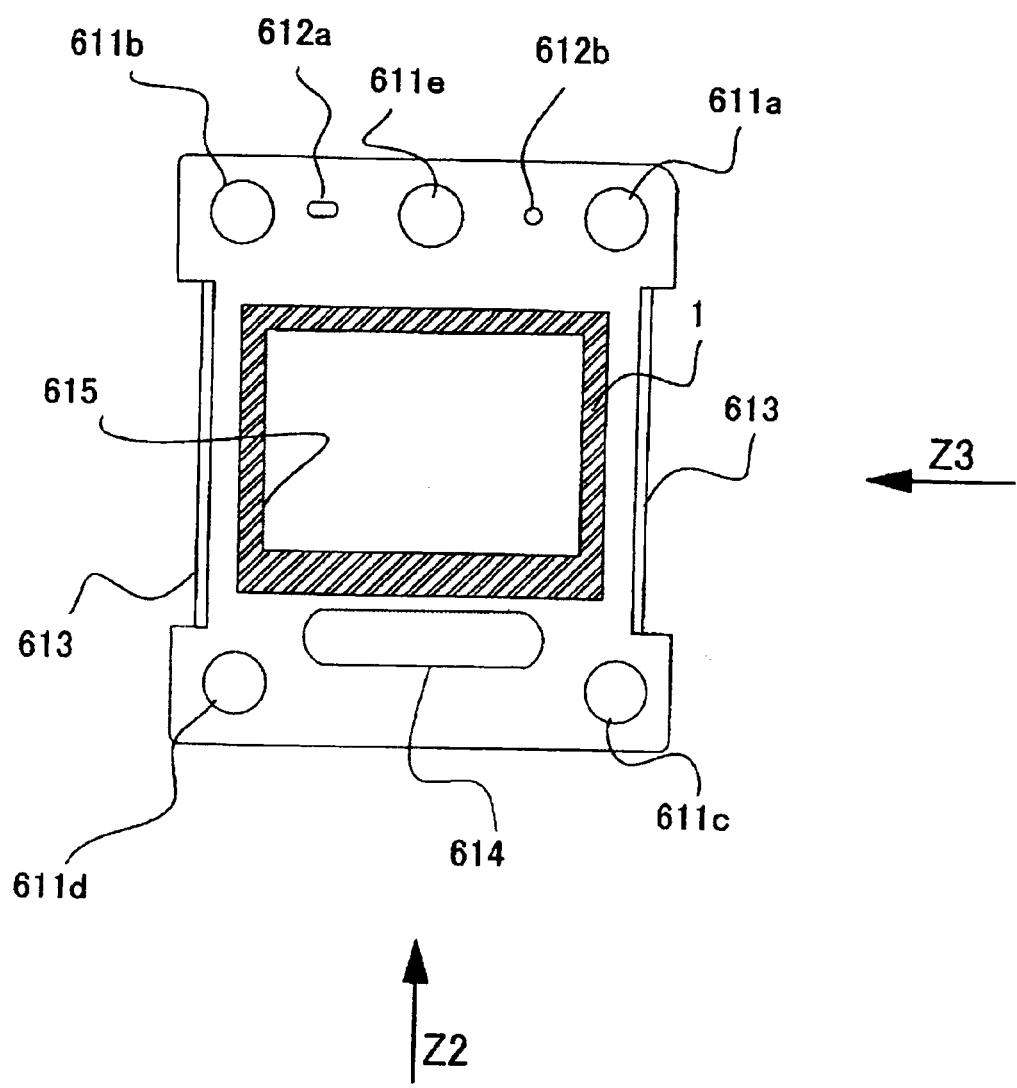
FIG. 9 is a front view of a plate member constituting the mounting case according to an exemplary embodiment of the present invention.
Figure 10:
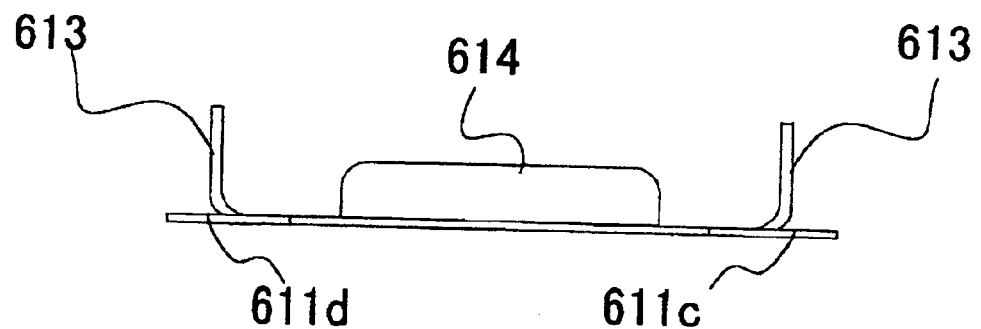
FIG. 10 is a back view shown from the direction of Z2 shown in FIG. 9.
Figure 11:
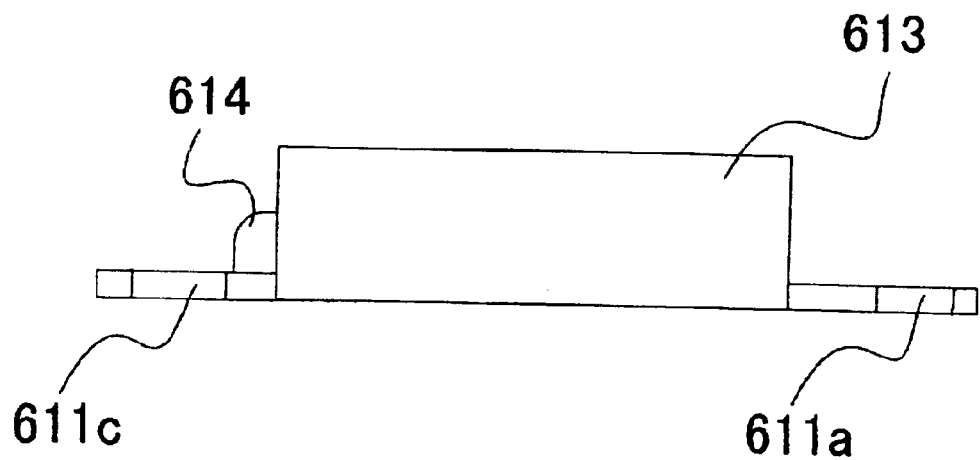
FIG. 11 is a side view shown from the direction of Z3 shown in FIG. 9.
Figure 12:
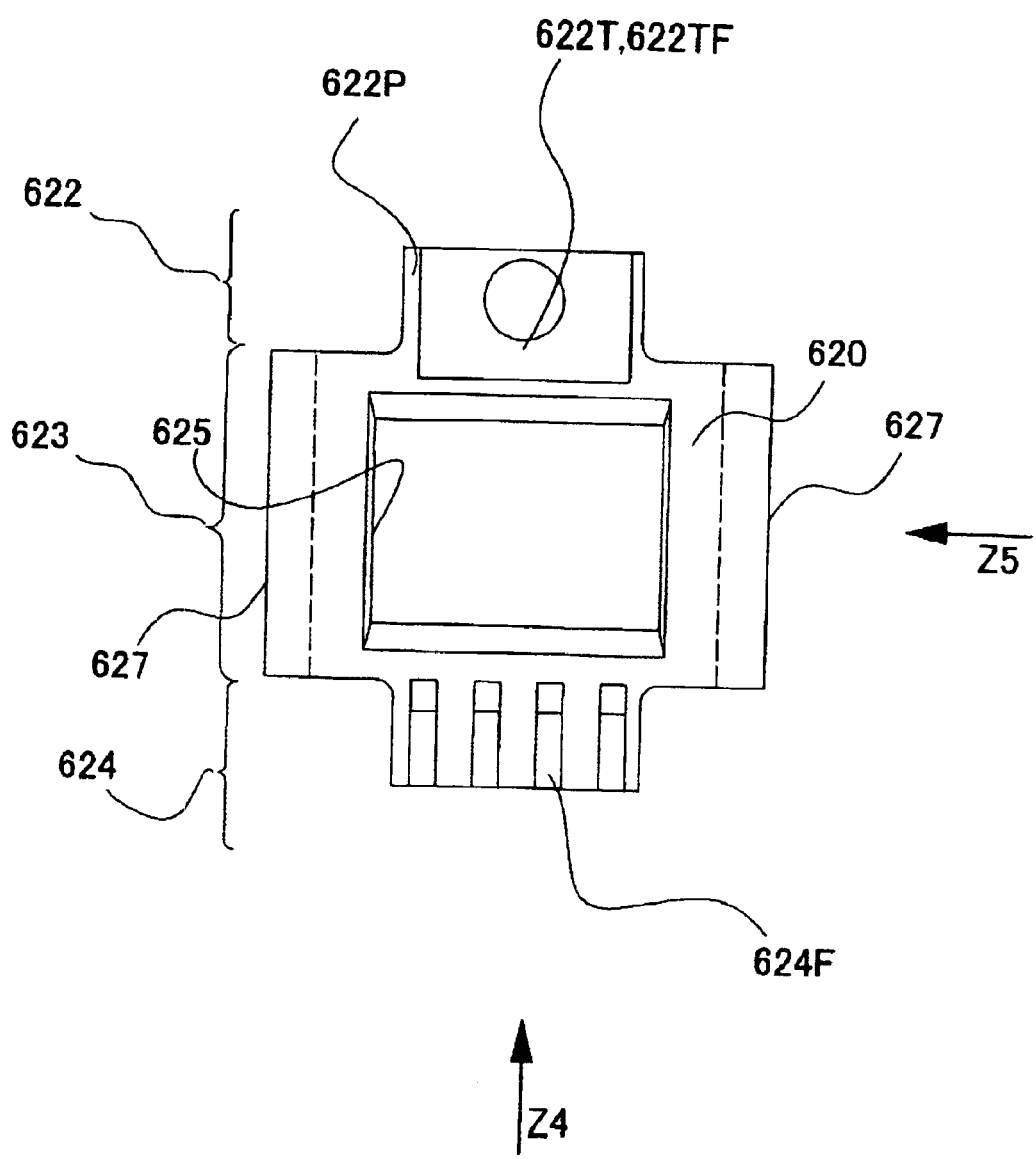
FIG. 12 is a front view of a cover member constituting the mounting case according to an exemplary embodiment of the present invention.
Figure 13:
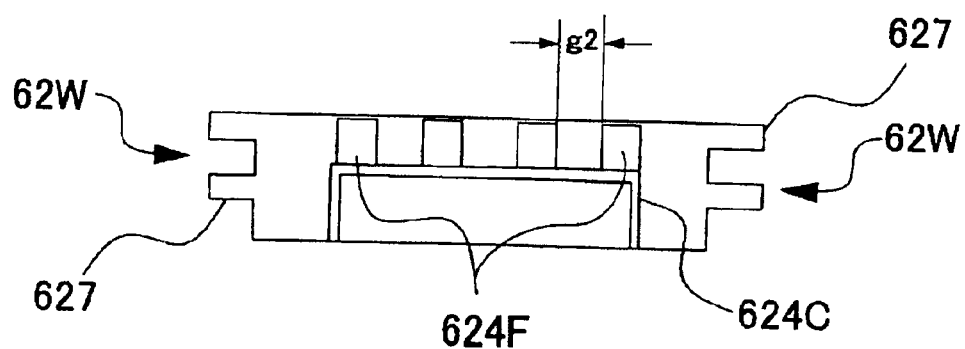
FIG. 13 is a back view shown from the direction of Z4 shown in FIG. 12.
Figure 14:
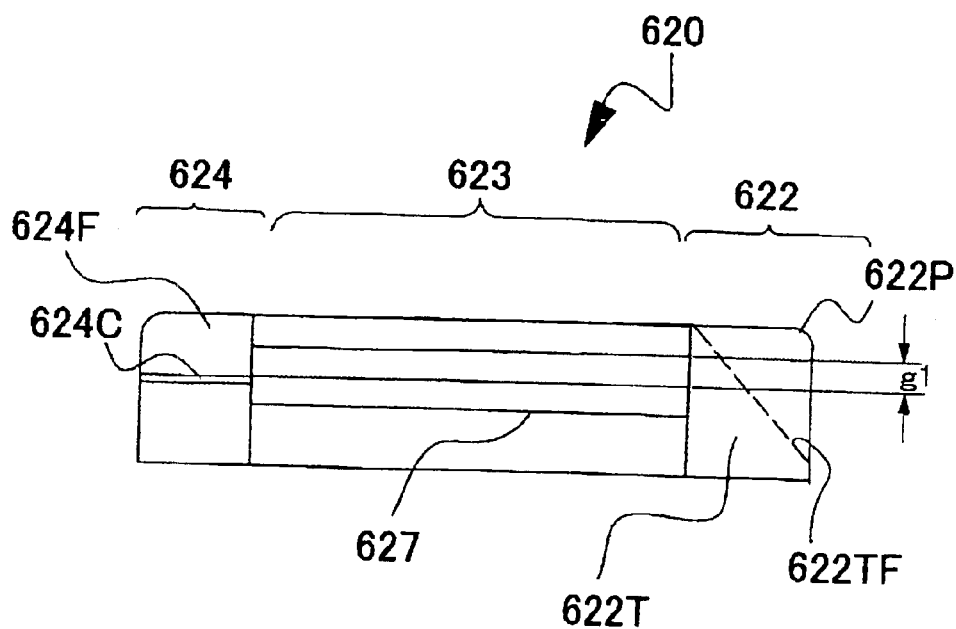
FIG. 14 is a side view shown from the direction of Z5 shown in FIG. 12.

First, the basic construction of a mounting case according to the exemplary embodiment will be described with reference to FIGS. 4 to 14. Herein, FIG. 4 is an exploded perspective view illustrating an electro-optical device together with a mounting case according to the exemplary embodiment. FIG. 5 is a front view of the electro-optical device encased in the mounting case. FIG. 6 is a cross-sectional view taken along the plane X1–X1' shown in FIG. 5. FIG. 7 is a cross-sectional view taken along the plane Y1–Y1' shown in FIG. 5. FIG. 8 is a back view shown from the direction of Z1 shown in FIG. 5. FIGS. 4 to 8 illustrate the mounting case in which electro-optical devices are accommodated. In addition, FIG. 9 is a front view of a plate member constituting the mounting case. FIG. 10 is a rear view shown from the direction of Z2 shown in FIG. 9. FIG. 11 is a side view shown from the direction of Z3 shown in FIG. 9. Furthermore, FIG. 12 is a front view of a cover member constituting the mounting case. FIG. 13 is a rear view shown from the direction of Z4 shown in FIG. 12. FIG. 14 is a side view shown from the direction of Z5 shown in FIG. 12.

As shown in FIGS. 4 to 8, the mounting case 601 includes the plate member 610 and the cover member 620. The electro-optical device 500, which is accommodated in the mounting case 601, include another optical component, such as a reflection preventing plate overlapped with the surface thereof, and an external circuit connecting terminal, to which a flexible connector 501 is connected, in addition to the electro-optical devices shown in FIGS. 2 and 3. Furthermore, a polarizing plate or a phase difference plate may be provided to the optical system of the liquid crystal projector 1100, or it may be overlapped with the surface of the electro-optical device 500.

Moreover, a dustproof substrate 400 is provided to portions not facing the liquid crystal layers 50 in the TFT array substrate 10 and the counter substrate 20 (see FIGS. 4 and 7). The dustproof substrate 400 is constructed to have a predetermined thickness. The dustproof substrate reduces or prevents dirt or dust around the electro-optical device 500 from directly attaching on the surface of the electro-optical device. Therefore, it is possible to effectively remove a defect that a figure of dirt or dust appears on the magnified projection image. Since the dustproof substrate 400 has the predetermined thickness, the dustproof substrate has a defocusing function to deviate the focus of the source light or the vicinity thereof from a location where dirt or dust exists, that is, from the surface of the dustproof substrate 400.

As shown in FIG. 4, the electro-optical device 500 including the TFT array substrate 10, the counter substrate 20, and the dustproof substrate 400 is accommodated in the mounting case 601 including the plate member 610 and the cover member 620. However, as shown in FIGS. 6 and 7, a molding member 630 is filled between the electro-optical device 500 and the mounting case 601. The molding member 630 ensures bonding between the electro-optical device 500 and the mounting case 601 and also surely reduces or prevents the occurrence of dislocation of the former within the latter.

In the exemplary embodiment, it is assumed that the light is incident on the cover member 620, passes through the electro-optical device 500, and emits from the plate member 610. That is, referring to FIG. 1, the component facing the dichroic prism 1112 is not the cover member 620 but the plate member 610.

Now, the construction of the plate member 610 and the cover member 620 constituting the mounting case 601 will be described more in detail.

First, as shown in FIGS. 4 to 11, the plate member 610 is a member having a substantially quadrilateral shape in plan view and is disposed to face one surface of the electro-optical device 500. In the exemplary embodiment, the plate member 610 and the electro-optical device 500 are directly abutted against each other, and the latter is mounted on the former.

More specifically, the plate member 610 includes a window 615, a strength reinforcement portion 614, a bent portion 613, a cover member fixing hole 612, and attaching holes 611a to 611d and 611e.

The window 615 is formed in an opening shape in which a portion of the member having a substantially quadrilateral shape is opened. For example, the window 615 is a member of enabling light to transmit from the upper side to the lower side in FIG. 6. The light transmitted through the electro-optical device 500 can be emitted by the window 615. When the electro-optical device 500 is mounted on the plate member 610, the peripheral region around the image display region 10a in the electro-optical device 500 is in an abutting state against the edge of the window 615. In this manner, the plate member 610 holds the electro-optical device 500.

Particularly, in the exemplary embodiment, as shown in FIGS. 9 or 4, a double coated adhesive tape 1 is provided on the edge of a window 615, i.e., a portion on which the electro-optical device 500 is put. Particularly, FIG. 7 illustrates an arrangement of a double coated adhesive tape 1 as seen in cross-sectional view. See a portion within the circle in FIG. 7. A peripheral region located around an image display region 10a in the electro-optical device 500 abuts against the edge of the window 615, such that the electro-optical device 500 and the plate 610 are bonded to each other via the double coated adhesive tape 1. Moreover, the abutting portion between the electro-optical device 500 and the plate member 610 via such a double coated adhesive tape 1 corresponds to an example of "area contacted portion", as described in an aspect of the present invention.

The strength reinforcement portion 614 has a three-dimensional shape formed by a process of convexing a portion of the member having the substantially quadrilateral shape higher than other portions in plan view. In this way, the strength of the plate member 610 is reinforced. The strength reinforcement portion 614 may be disposed at a location to substantially abut against one side of the electro-optical device 500 (see FIG. 7). However, strictly speaking, both of them do not abut against each other in FIG. 7.

The bent portion 613, as shown in FIGS. 9 to 11, is formed such that a part of each of two opposed sides of a generally quadrilateral member forming the appearance of the plate member 610 is bent toward the inside of the quadrilateral shape. Particularly, in the exemplary embodiment, as shown in FIGS. 9 and 11, the bent portion 613 is bent such that it rises at a right angle from the quadrilateral plate-shaped member. The bent portion 613 according to the exemplary embodiment is formed in the described manner so that one side thereof faces the outside of the plate member 610 and the other side thereof faces the inside of the plate member 610. Hereinafter, the outer surface related to the former will be referred to as a first facing surface 613F1 and the inner surface related to the latter will be referred to a second facing surface 613F2 (see FIG. 6).

Among these, first, a second facing surface 613F2 of the bent portion 613 contacts with the outer surface of the electro-optical device 500 via the molding material 630 at the time of assembling the plate member 610 and the cover member 620 together, as shown in FIG. 6. In this case, the electro-optical device 500, as shown in FIG. 7, extends in left and right directions in FIG. 7 with a predetermined length, and as shown in FIG. 11, the bent portion 613 extends in left and right directions in FIG. 11 with a predetermined length. At the time of assembling the plate member 610 and the cover member 620 together, it is preferable to suppose that these FIGS. 7 and 11 just overlap each other. For this reason, as shown in FIG. 6, when the second facing surface 613F2 of the bent portion 613 abuts against the outer surface of the electro-optical device 500, the contact area therebetween becomes comparatively large. However, since FIG. 7 is a cross-sectional view taken along plane Y–Y' of FIG. 5, they are different from each other, strictly speaking. Moreover, the abutting portion of the exemplary embodiment between the second facing surface 613F2 and the side of the electro-optical device 500 corresponds to an example of the "second abutting portion" referred to in an aspect of the present invention, and corresponds to an example of the "area contacted portion" referred to in an aspect of the present invention.

The first facing surface 613F1 of the bent portion 613 is abutted against the inner surface of the cover member 620 when assembling the plate member 610 and the cover member 620 together (see FIG. 6).

More specifically, in the exemplary embodiment, the cover member 620, in particular, the cover main body 623, as shown in FIGS. 5 to 8 and FIGS. 12 to 14, has a "lid-free box shape". Concretely, the cover member 620, as shown in FIG. 6, is provided with a floor portion 62F called a "floor" in the "lid-free box shape", and a wall portion 62W called a "wall" that is erected on the floor portion 62F.

In that case, the term "lid-free" means that a portion called a "ceiling" does not exist.

The cover member 620 having such a shape, as shown in FIG. 6, is arranged to cover the electro-optical device 500 such that the floor portion 62F faces the surface of a dustproof substrate 400 at the counter substrate 20, which constitutes the electro-optical device 500 (that is, the floor portion 62F is located on the upper side in Figure), and the wall portion 62W faces the side of the electro-optical device 500. Meanwhile, since the cover member 620 according to the exemplary embodiment is arranged in such a manner as to substantially completely cover the electro-optical device 500, the plate member 610 can serve as a lid for the cover member 620 having the lid-free box shape(see FIGS. 5 to 8).

Also, since the cover member 620 is arranged as described above, the first facing surface 613F1, as shown in FIG. 6, is adapted to abut against the inner surface of the wall portion 62W, i.e., the surface of the wall portion 62W that faces a space surrounded by the wall portion 62W and the floor portion 62F, or a space receiving the electro-optical device 500.

As described above, in the exemplary embodiment, since the inner surface of the wall portion 62W is adapted to abut against the first facing surface 613F1 of the bent portion 613 in the plate member 610, the plate member 610 and the cover member 620 contact with each other with a comparatively wide contact area therebetween. Further, in the exemplary embodiment where such a contact state is employed, the bent portion 613 is located inside the lid-free box shape, which constitutes the cover member 620.

Moreover, the abutting porting between the first facing surface 613F1 and the wall portion 62W in this exemplary embodiment corresponds to an example of the "first contacting portion" referred to in an aspect of the present invention. Further, the plate member 610 and the cover member 620 according to the exemplary embodiment is adapted to be fixed each other using a cover member fixing hole 612 and a convex portion 621. In this case, in a predetermined region where the cover member fixing hole 612 is formed (see FIG. 9), and one side of a tapered portion 622T where the convex portion 621 is formed, i.e., one side of the aforementioned triangular prism introduced for illustrating the tapered portion 622T, the plate member 610 and the cover member 620 abut against each other. See reference numeral 622F in FIG. 7. The "first abutting portion" referred to in an aspect of the present invention also implies the above-mentioned abutting portion.

The cover member fixing hole 612 is a hole to engage with a convex portion 621 provided at the corresponding location in the cover member 620. The plate member 610 and the cover member 620 are fixed to each other by engaging the cover member fixing hole portion 612 with the convex portion 621. In addition, in the exemplary embodiment, the cover member fixing hole 612 includes two holes as shown in each figure. In case of need to distinguish the holes, the two holes are referred to as cover member fixing holes 612a and 612b, respectively. Corresponding to the holes, the convex portion 621 includes two convex portions. In case of need of distinguishing the convex portions, the two convex portions are referred to as convex portions 621a and 621b, respectively.

The attaching holes 611a to 611d are used to attach the electro-optical device encased in the mounting case within the liquid crystal projector 1100 as shown in FIG. 1. In the exemplary embodiment, the attaching holes 611a to 611d are provided to four corners of the member having the substantially quadrilateral shape. In addition to the attaching holes 611a to 611d, an attaching hole 611e is provided in the exemplary embodiment. The attaching hole 611e is disposed to form a triangle together with the attaching holes 611c and 611d of the attaching holes 611a to 611d. In other words, the attaching holes 611e, 611c, and 611d are disposed at the corresponding apexes of the triangle. In this manner, in the exemplary embodiment, it is possible to fix the four points at the four corners using the attaching holes 611a to 611d and to fix the three points at the three corners using the attaching holes 611e, 611c, and 611d.

In the exemplary embodiment, particularly, the plate member 610 has the following features. That is, the plate member 610, according to the exemplary embodiment, is made of a material having a coefficient of linear expansion within a predetermined range, preferably, $\pm 5 \times 10^{-6}/°$ C., and more preferably $\pm 2.5 \times 10^{-6}/°$ C., using as a reference a coefficient of linear expansion of the counter substrate 20 and the TFT array substrate 10, which constitutes the electro-optical device.

Specifically, in the exemplary embodiment, the counter substrate 20 and the TFT array substrate 10, or the aforementioned dustproof substrate 400 (hereinafter, referred to as "TFT array substrate, etc.") is made of, for example, quartz glass, and the plate member 610 is made of, for example, so-called invar alloy (for example, 36NI—Fe alloy). By doing this, the coefficient of linear expansion of the former becomes approximately 0.3 to $0.6 \times 10^{-6}/°$ C. and the coefficient of linear expansion of the former becomes approximately $1.2 \times 10^{-6}/°$ C. Accordingly, the latter is approximaterly 0.6 to $0.9 \times 10^{-6}/°$ C. greater than the former, and satisfies the aforementioned severest conditions.

Next, secondly, the cover member 620, as shown in FIGS. 4 to 8 and FIGS. 12 to 14, is a member having a substantially cube shape, and is arranged to face the surface opposite to the surface facing the plate member 610 in the electro-optical device.

The cover member 620 is preferably made of light shielding resin, metallic material, and the like in order to reduce or prevent the leakage of the light in the peripheral region of the electro-optical device 500 and the introduction of the stray light from the peripheral region to the image display region 10a. Since it is preferable that the cover member 620 should function as a heat sink for the plate member 610 or the electro-optical device 500, the cover member 620 is preferably made of materials of relatively high heat conductivity, such as aluminum, magnesium, copper, or an alloy thereof.

Further, the convex portion 621 is formed in the cover member 620. The convex portion 621 is used to fix the plate member 610, and include two convex portions 621a and 621b at the locations corresponding to the cover member fixing holes 612a and 612b. As shown in FIG. 5, the convex portion 621 according to the exemplary embodiment is provided to form a portion of the cooling air introducing portion 622 or a tapered portion 622T as described later. In FIG. 5, although the original convex portion 621 is not shown, it is particularly shown in FIG. 5.

In the exemplary embodiment, particularly, the cover member 620 has a cooling air introducing portion 622, a cover main body 623, and the cooling air discharging portion 624 in more detail. Moreover, in the exemplary embodiment, all these three portions 622, 623, and 624 are integrally formed.

First, the cooling air introducing portion 622, as shown well in FIG. 4, FIG. 5, FIG. 7, FIG. 12, or FIG. 14, include the tapered portion 622T and the baffle plate 622P, which constitute an example of the "cooling air scattering prevention portion" or the "cooling air introducing portion", respectively, referred in the present invention.

In the exemplary embodiment, the tapered portion 622T constituting an example of the "slope portion" referred to in an aspect of the present invention generally has an appearance such as a triangular prism whose bottom face is a right-angled triangle. In addition, the tapered portion 622T has an appearance where one side of the triangular prism in the tapered portion is attached on the one side of the cover main body 623. In this case, the one side of the triangular prism includes a side interposed between a rectangular portion of the bottom of the triangular prism and a corner portion adjacent thereto. Therefore, the tapered portion 622T has a shape including a root portion 622T1 with a height largest at the side of the cover main body 623 and a tip 622T2 with a height gradually lowered therefrom. Herein, the term "height" is a distance in the top-bottom direction in FIG. 7. In FIG. 7, a dotted line extending in the top-bottom direction is represented as a reference. The tapered portion 622T having such a shape can be provided in a "pointed shape". Also, the cover member 620 including the tapered portion 622T having such a pointed shape is arranged such that the tip 622T2 constituting a part of the pointed shape faces the flow of cooling air. See FIG. 15 and the description related thereto, which will be described later.

On the other hand, the baffle plate 622P has a shape of a wall erected along one side between two apexes except for the right angle apexes on the bottom of the triangular prism. In terms of the aforementioned height, the height of the baffle plate 622P is constant at any place between the root portion 622T1 and the tip 622T2, although the height of the tapered portion 622T is gradually lowered from the root portion 622T1 to the tip 622T2.

The baffle plate 622P arranged as descibed above can be formed to surround one side 622TF of the tapered portion 622T from both sides (see FIG. 4). Moreover, the side 622TF is an example of the side, which is typically assumed as the "surface constituting a slope portion" referred to in an aspect of the present invention.

Subsequently, secondly, the cover main body 623, which is a member having a substantially rectangular parallelepiped shape, is interposed between the cooling air introducing portion 622 and the cooling air discharging portion 624 as shown in FIGS. 4 to 8 and FIGS. 12 to 14.

Herein, the inside of the rectangular parallelepiped shape, which accommodates the electro-optical device 500, is in the so-called hollow state. Strictly speaking, the cover main body 623 is a member having a shape of a box without its cover. The "cover" in this expression may be considered to correspond to the plate member 610 described above.

In detail, the cover main body 623 includes the window 625 and the side fin portion 627. Moreover, the side fin portion 627 corresponds to an example of the "surface area increasing portion" or the "fin", referred to in an aspect of the present invention.

Among these, first, the window 625 whose bottom plane having the box shape and a top surface in FIG. 4 or 6 is formed in an opening and allows light to penetrate from the upper part to the lower part in FIG. 6. The light emitted from the lamp unit 1102 within the liquid crystal projector 1100 shown in FIG. 1 can be incident to the electro-optical device 500 through the window 625. Further, the edge of the window 625 has a tapered shape, as well shown in FIG. 7. As a result, the side 622TF in the tapered portion 622T and the surface 500F of the electro-optical device 500 on the upper side in FIG. 7 are adapted to be "continuous". In other words, first, the side 622TF intersects the surface 623F of the cover main body 623 on the upper side in FIG. 7 where the window 625 is formed, at an angle that is not a right angle. Second, the surface 623F intersects the surface 625F constituting the tapered shape of the edge of the window 625, at an angle that is not a right angle. Third, the surface 625F also intersects the surfae 500F at an angle that is not right angle. As a result, the respective surfaces 622TF, 623F, 625F and 500F are adapted to gently continute without forming a step difference therebetween.

In addition, in the cover main body 623 having the window 625, the peripheral region near the image display region 10a in the electro-optical device 500 may be preferably formed to abut against the edge of the window 625 similarly to the description of the window 615 in the plate member 610 (see FIG. 7). By doing so, the cover main body 623, more particularly, the edge of the window 625 can also hold the electro-optical device 500.

In the exemplary embodiment, particularly, as shown in FIG. 5 or FIG. 4, a double coated adhesive tape 2 is also provided at the edge of the window 625 of the cover member 620 in the similar way. See a portion inside the circle in FIG. 7. As a result, the cover member 620 and the electro-optical device 500 are also bonded to each other via the double coated adhesive tape 2. Further, these cover member 620 and electro-optical device 500 have the "area contacted portion", referred to in an aspect of the present invention, in a region where the double coated adhesive tape 2 exists.

Both the double coated adhesive tape 2 and the double coated adhesive tape 1 provided at the edge of the window 615 of the plate member 610 has a rectangular shape to surround the whole edges of the windows 615 and 625, in other words, apertures of the windows 615 and 625.

As seen from the electro-optical device 500, the double coated adhesive tapes 1 and 2 can be provided so as to correspond the whole region in the peripheral region of the electro-optical device 500.

Further, the double coated adhesive tapes 1 and 2 according to the present exemplary embodiment have particularly the following features. That is, firstly, the double coated adhesive tapes 1 and 2 are made of a material having a heat conductivity of 0.6 or more W/m·K, and more preferably, 1.0 or more W/m·K. Concretely, double coated adhesive tapes satisfying these conditions may include a double coated adhesive tape including heat conductive silicon rubber, and a double coated adhesive tape employing a multi-layer structure in which different materials including heat-conductive silicon rubber are used for an adhesive layer and a layer to be bonded, and includes an acryl-based heat-conductive double coated adhesive tape mainly including acryl rubber, and including metal oxide or metal nitride, etc., in addition thereto. Moreover, as the double coated adhesive tape, EHUCO TM SHEET manufactured by Ehuco Co., Ltd., or TCATT heat-conductive adhesive transfer tape (Product Nos. 9882, 9885, and 9890) manufactured by Sumitomo 3M Co. Ltd., etc. are marketed and these are available.

Next, the side fin portion 627 is formed at both sides of the cover main body 623. Herein, the term "both sides" is the sides except for the sides where the aforementioned cooling air introducing portion 622 and the cooling air discharging portion 624 are provided. The both sides (hereinafter, sometimes referred to as a "sidewall portion 62W"), for example, face one side of the electro-optical device 500 and the other side facing the one side, respectively, as shown in FIG. 6, etc. In addition, the inner surface of the sidewall portion 62W is abutted against the outer surface of the bent portion 613 in the plate member 610 at the process of assembling the cover member 620 and the plate member 610 together (see FIG. 6). Like this, the sidewall portion 62W according to the exemplary embodiment may face the one side and the other side of the electro-optical device 500, in particular, through the bent portion 613.

More specifically, the side fin portion 627 has a shape of a plurality of portions straightly protruding from the side in parallel from the cooling air introducing portion 622 to the cooling air discharging portion 624 as shown in FIG. 4 or FIGS. 6 and 13. In the exemplary embodiment, in particular, two columns of straight fins are disposed in parallel. The presence of the side fin portion 627 leads to the increase of the surface area of cover main body 623 or the cover member 620. In particular, in the exemplary embodiment, since the side fin portion 627 is formed with sidewall portion 62W having a relatively large ratio of occupation over the entire cover member 620, the increase of the surface area is effectively obtained. Moreover, in the exemplary embodiment, the gap g1 (see FIG. 14) between two columns of linear fins consitituting the side fin portion 627 may be set to 1 mm or more.

The side fin portion 627 having the aforementioned shape may be formed by a process such as, for example, a cutting process, a forging process, a pressing process, an injection molding process, or a casting process, at the same time of or after the process of forming the cover member 620. According to these processes, it is possible to easily form the side fin portion 627.

Subsequently, third, the cooling air discharging portion 624 includes a flexible connector leading portion 624C and a rear fin portion 624F as shown in FIGS. 4, 5, 8, 12, or 13. The flexible connector leading portion 624C is provided on one side of the cooling air discharging portion to face the side of the cover main body 623 on which the tapered portion 622T is provided. More specifically, a member having a cross-sectional shape of "U" on the aforementioned side is attached by an aperture having a cross-sectional shape of "U" in the downward direction of FIG. 8 or 13 as shown in FIG. 8 or 13. A flexible connector 501 connected to the electro-optical device 500 is drawn out from the space in a shape of "U".

On the other hand, the rear fin portion 624F corresponding to an example of the "surface area increasing portion" or the "fin" referred in the present invention is provided on the ceiling plate having a U-shaped section in the flexible connector leading portion 624C. More specifically, the rear fin portion 624F has a shape of a plurality of portions straightly protruding from the sealing plate in parallel to correspond to the reference numerals in a direction of a straightly protruding portions, that is, the side fin portions 627 to be described later, as shown in FIG. 4, 5, 8, 12, or 13. In the exemplary embodiment, particularly, the rear fin portion 624F, as shown in the above respective figures, includes four juxtaposed linear fins. Meanwhile, these four fins are formed to comply with the flow of cooling air. See FIG. 17 and the description related thereto, which will be described later. Further, in the exemplary embodiment, the gap g2 (see FIG. 8 and FIG. 13) between the four linear fins is set to be 1 mm or more. The rear fin portion 624F of this arrangement allows the surface area of the cooling air discharging portion 624 or the cover member 620 to be increased.

That is, the rear fin portion 624F having the aforementioned shape may be formed by a process such as, for example, a cutting process, a forging process, a pressing process, an injection molding process, or a casting process, at the same time of or after the process of forming the cover member 620. According to the above method, the side fin portion 624F can be comparatively easily formed.

Moreover, the gap g2 between four linear fins constituting the rear fin portion 624F is set to be 1 mm or more as described above. That is, for example, a linear fin located at the leftmost position in FIG. 15 and a fin located at the next right position thereof have a gap of 1 mm or more therebetween, and the next right fin and a fin located at the further next right position thereof have a gap of 1 mm or more, and so on. In this case, the "first column of fins" and the "second column of fins" referred to in an aspect of the present invention, for example, means a fin located at the leftmost position and the next right fin thereof, or the next right fin and the further next right fin thereof. Like this, the "first column of fins" and the "second column of fins" referred to in an aspect of the present invention are generally adapted irrespective of the number of columns of fins actually provided. Meanwhile, the "first column of fins" and the "second column of fins" have a concept which can be also applied to two columns of linear fins constituting the side fin portion 627.

Further, in an aspect of the present invention, it is preferable to form dimples to give depressions to the surface of the cover member 620, thereby increasing the surface area thereof, instead of the fins or in addition to the fins.

Figure 16:
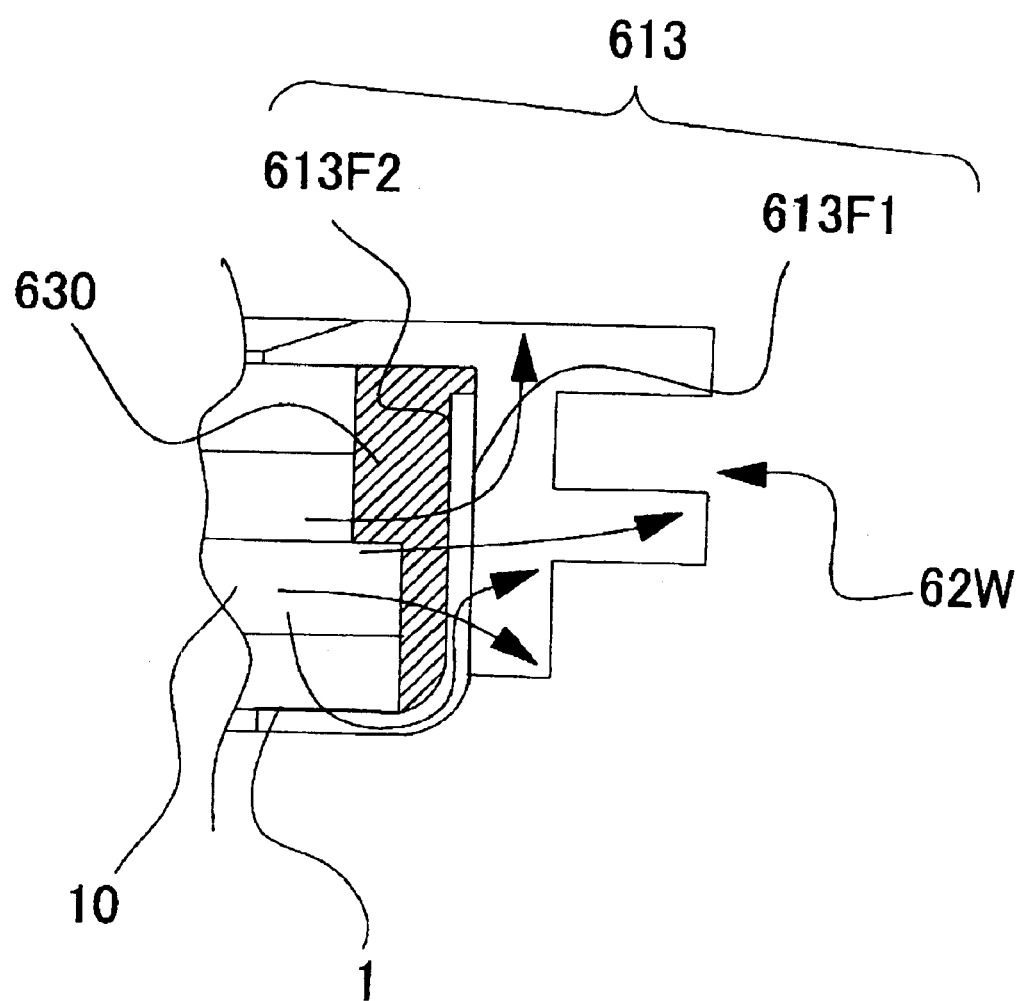
FIG. 16 is a partial enlarged view of FIG. 6, and an explanation view showing a state of heat transfer by the bent portion.

Cooling Operation and Effects of an Electro-Optical Device by a Mounting Case According to the Exemplary Embodiment Hereinafter, in case that the electro-optical device encased in a mounting case constructed as described above is installed in liquid crystal projector 1100 as shown FIG. 1, a description will be made with reference to the figures referred to hitherto and FIGS. 15 and 16 about how the mounting case 601 cools the electro-optical device 500, and how the cooling can be effectively carried out. Herein, FIG. 15 is a perspective view of an electro-optical device encased in a mounting case and illustrates a typical "heat transfer path" in the electro-optical device encased in a mounting case. FIG. 16 is a partially enlarged view of FIG. 6, and an explanatory view illustrating a heat transfer behavior through a bent portion. Moreover, the illustration of elements as well as the window will be appropriately omitted in FIG. 15 in order to clearly show the "heat transfer path".

First, the electro-optical device 500 is irradiated with intense light from a lamp unit 1102 within the liquid crystal projector 1100, and thereby the temperature thereof gradually rises. Herein, in the electro-optical device encased in the mounting case according to the present exemplary embodiment, the "heat transfer path" reaching the cover member 620 from the electro-optical device 500 via the plate member 610 is formed, thereby achieving the cooling of the electro-optical device 500.

In the exemplary embodiment, it is possible to achieve various heat transfer paths as a typical example of the above "heat transfer path", as shown FIG. 15. That is, there provided, first, a heat transfer path HR1 reaching the cover member 620 from the electro-optical device 500 via the bent portion 613 of the plate member 610, second, a heat transfer path HR2 reaching the tapered portion 622T of the cooling air introducing portion 622 from the electro-optical device 500 via the double coated adhesive tape 1, and third, a heat transfer path HR3 directly reaching the cover 620 from the electro-optical device 500 via the double coated adhesive tape 2 (herein, the tape 2 is not shown in FIG. 15. See FIG. 4, FIG. 7, etc.). Moreover, a portion located on the way of the heat transfer paths HR1 and HR2 shown in FIG. 15 and indicated by thick line means that heat is conducted through the plate member 610 in the related portion.

First, the heat transfer path HR1 will be described. In this heat transfer path HR1, it is possible to effectively achieve the cooling of the electro-optical device 500 thanks to the presence of the bent portion 613. This is because the outer surface of the electro-optical device 500 contacts the second facing surface 613F2 of the bent portion 613 via the molding material 630, the first facing surface 613F1 as the rear face of the second facing surface 613F2 contacts the inner face of the wall portion 62W of the cover member 620. Heat generated in the electro-optical device 500, as indicated by the arrow in FIG. 15, and FIG. 16 which is a partially enlarged view of FIG. 6, is sequentially transferred to the bent portion 613 and cover member 620, in other words, the plate member 610 and cover member 620 function as a heat sink of the electro-optical device 500, thereby effectively cooling the electro-optical device 500.

In addition, in the exemplary embodiment, particularly, such heat transfer via the bent portion 613 or the heat transfer path HR1 has the following features.

First, since the contact area between the bent portion 613, the electro-optical device 500 and the wall portion 62W is obtained comparatively extensively as described above, the quantity of heat transferred therebetween is relatively increased. Accordingly, the cooling of the electro-optical device 500 is further promoted. In this connection, the "first abutting portion" referred to in an aspect of the present invention, as described above, includes a region where the cover member fixing hole 612 and the convex portion 621 other than the bent portion 613 and the wall portion 62F. That is, the heat transfer from the plate member 610 to the cover member 620 occurs even in the above region. In FIG. 15, it is possible to achieve a heat transfer such that heat is transferred through the heat transfer path HR1 to the middle thereof and through the heat transfer path HR2 to the middle thereof. That is, the heat transferred to the wall portion 62W via the bent portion 613 reaches the cooling air introducing portion 622 from the cover main body 623. In this point, the heat transfer from the electro-optical device 500 to the plate member 610 and cover member 620 is effectively carried out, thereby greatly promoting the cooling of the electro-optical device 500.

Second, since a part of the plate member 610 is bent to form the bent portion 613, the thickness of the bent portion, i.e., the distance between the first facing surface 613F1 and the second facing surface 613F2 is comparatively small (see FIG. 13 and FIG. 6). Accordingly, since the flow of heat reaching the wall portion 62W from the electro-optical device 500 via the bent portion 613 is performed without stagnation, the cooling of the electro-optical device 500 is greatly promoted. Meanwhile, the thickness of the plate member 610 and the bent portion 613 may be set to be, for example, 0.2 to 0.8 mm from the above-mentioned viewpoint or from the viewpoint of the strength which the plate member 610 should have.

Next, second, the heat transfer paths HR2 and HR3 will be described. In these heat transfer paths HR2 and HR3, it is possible to very effectively achieve the cooling of the electro-optical device 500 thanks to the presence of the double coated adhesive tapes 1 and 2. This is because the double coated adhesive tapes 1 and 2 are made of a material having a high heat conductivity as described above, thereby efficiently performing the heat transfer from the electro-optical device 500 to the plate member 610, or the heat transfer from the electro-optical device 500 to the cover member 620. Moreover, since the double coated adhesive tapes 1 and 2 have a rectangular shape and a comparatively broad area, i.e., the electro-optical device 500, the plate member 610, and the cover member 620 have an area-contacted portion, respectively, the working effects related to the above heat transfer are further promoted.

Moreover, in the heat transfer paths HR3, the heat transfer from the electro-optical device 500 to the cover member 620 is performed without passing through the plate member 610. The "heat transfer path" referred to in an aspect of the present invention, includes such a heat transfer path HR3. Further, the heat transfer paths HR1, HR2, and HR3 as shown in FIG. 15, simply show a typical implementation of flow of heat, respectively. In the electro-optical device encased in the mounting case according to the exemplary embodiment, it goes without saying that the various heat transfer paths can be implemented using the electro-optical device 500 as a starting point other than the heat transfer paths shown in FIG. 15. For example, as also shown in FIG. 16, a heat transfer path reaching the bent portion 613 from the electro-optical device 500 via the double coated adhesive tape 1 and further reaching the wall portion 62W from the bent portion can be considered. Meanwhile, since the molding material 630 does not exist in such a heat transfer path, it is possible to effectively achieve the heat transfer from the electro-optical device 500 to the cover member 620 via the plate member 610 even in an aspect (for example, see FIG. 22) which implements the fixation of the electro-optical device 500 by the plate member 610 without using the molding material 630.

In any case, in the electro-optical device encased in a mounting case according to the exemplary embodiment, it is possible to absorb heat from the electro-optical device 500, i.e., to effectively achieve the cooling of the electro-optical device 500 by the heat transfer paths HR1, HR2, and HR3 as shown in FIG. 15. Accordingly, according to an aspect of the present invention, it is possible to effectively reduce or prevent the temperature of the electro-optical device 500 from rising, to reduce or prevent, for example, the characteristics of the liquid crystal layer 50 from deteriorating, or to reduce or prevent so-called hot spots from being created in the liquid crystal layer 50. As a result, it is possible to display high quality images.

In addition to the above, according to the exemplary embodiment, it is also possible to achieve the following working effects. That is, in the exemplary embodiment, the electro-optical device 500 can be effectively cooled as described above. However, since a large quantity of heat is transferred via the plate member 610 as in the heat transfer paths HR1 and HR2, the temperature of the plate member 610 rises as time lapses. Accordingly, the plate member 610 thermally expands. Since the plate member 610 functions as a member to fix the electro-optical device 500 (see later description), this may cause the dislocation of the electro-optical device 500 in the mounting case 601.

Further, there is a limit to the thermal capacity of the plate member 610 and or the thermal capacity of the cover member 620. When the absorption of heat from electro-optical device 500 continues, their thermal capacity may be logically saturated before long. As a result, the plate member 610 and the cover member 620 may not function as a heat sink sufficiently.

However, in the electro-optical device encased in the mounting case according to the exemplary embodiment, working effects effectively solving the above-mentioned two problems is achieved. Hereinafter, these points will be described sequentially.

First, regarding the first problem, since the plate member 610 according to the exemplary embodiment is made of a material having a coefficent of linear expansion within predetermined range, using as a reference a coefficent of linear expansion of the TFT array substrate 10, etc., constituting the electro-optical device 500. According to the aforementioned example, the plate member 610 is made of, for example, invar alloy, and the TFT array substrate 10, etc., is made of quarts glass. As a result, the first problem is effectively solved.

That is, according to the above-mentioned construction, since the TFT array substrate 10 and the plate member 610 have the approximately same coefficient of linear expansion, both of them expand or contract in a similar way provided that they lies in the same thermal condition. As a result, first, it is possible to avoid a situation in which a greatly contracted plate member 610 contacts the electro-optical device 500, as supposed in case that the coefficient of linear expansion of the plate member 610 is greater than that of the TFT array substrate 10, etc., and the ambient temperature is low. Further, second, it is also possible to avoid a situation in which the plate member 610 thermally expands greatly, and thereby the electro-optical device 500 is dislocated from its installation place with respect to the plate member 610, as supposed in case that the ambient temperature is higher. Thus, in an aspect of the present invention, it is possible to suppress a situation in which irregular color occurs on an image by the action of compressive force on the electro-optical device 500, which is is paricularly concerned in a low temperature environment. Further, it is possible to suppress a situation in which the dislocation of the electro-optical device 500, which is particularly concerned in a high temperature environment, is generated.

Figure 17:
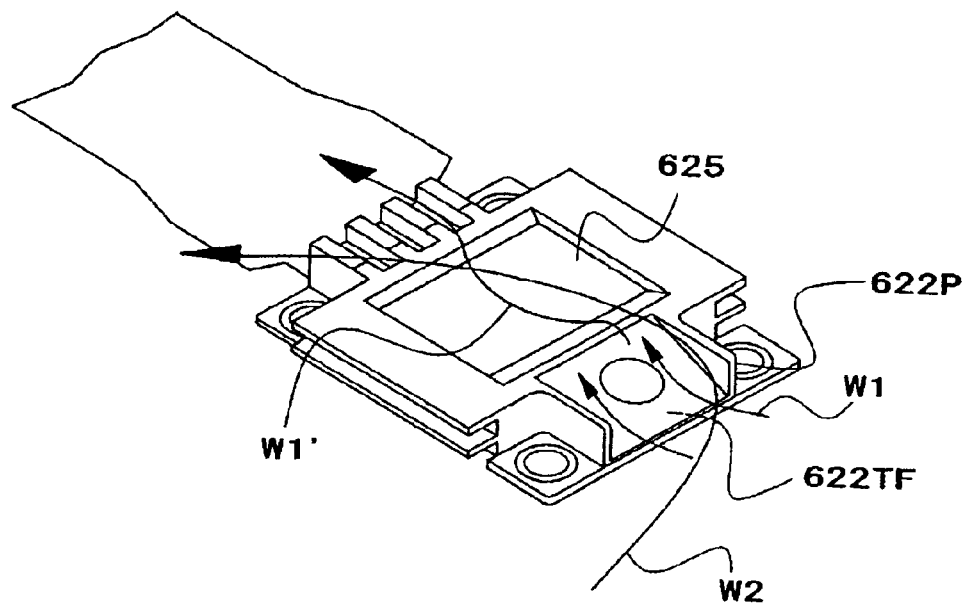
FIG. 17 is a perspective view of the electro-optical device encased in the mounting case according to an exemplary embodiment of the present invention and illustrates the flow of air into the electro-optical device encased in the mounting case.

Further, regarding the second problem, the cover member 620 according to the exemplary embodiment includes the cooling air introducing portion 622, the side fin portion 627, the cooling air discharging portion 624, the rear fin portion 624F, etc., thereby effectively solving the second problem. Hereinafter, this will be explained in detail with reference to FIG. 17. Here, FIG. 17 is a perspective view of an electro-optical device encased in the mounting case and illustrates a typical flow of a wind into the electro-optical device encased in the mounting case. In addition, in order to implement the same flow of the cooling air in the liquid crystal projector 1100 shown in FIG. 1 as that of FIG. 17, it is necessary to provide the electro-optical device encased in the mounting case, that is, light valves 100R, 100G, and 100B so that the outlets 100RW, 100GW, and 100BW described above with reference to FIG. 1 can face the cooling air introducing portion 622 constituting the cover member 620.

Since the cover member 620 has the aforementioned construction, the wind blown from the fan 1300 provided in the liquid crystal projector 1100 as shown in FIG. 1 is flowing near the mounting case 601 or the cover member 620 as shown in FIG. 17.

Figure 18:
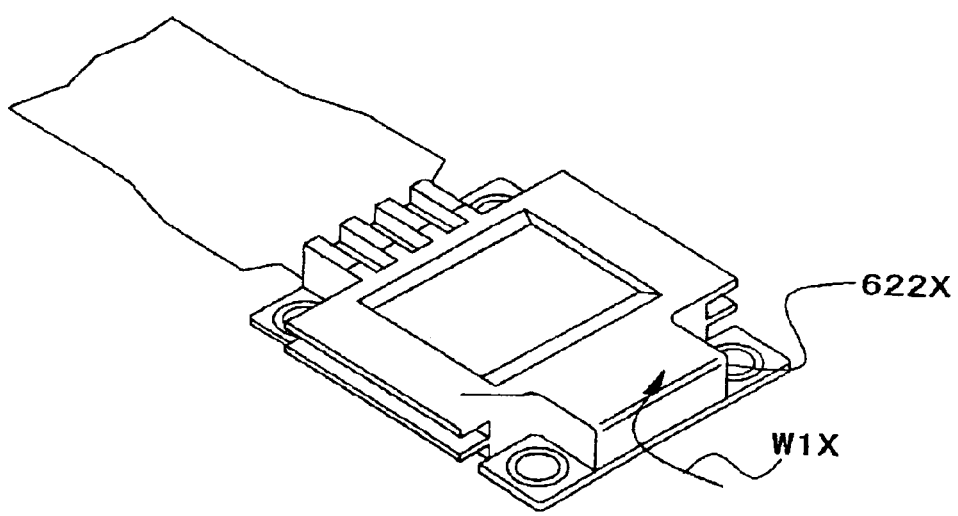
FIG. 18 is a view of a comparative example with respect to FIG. 17.

First, cooling air is blown to the cover main body 623 to which the surface 500F of the electro-optical device 500 is exposed, as if it runs up the tapered portion 622T of the cooling air introducing portion 622 (see reference numeral W1). Herein, if the tapered portion 622T, or the tip 622T2 as a part constituting the tapered portion does not exist, and if it is supposed that, for example, a block-shaped member 622X having a predetermined thickness exists instead of the tapered portion 622T, as shown in FIG. 18 as a comparative figure of FIG. 17, it is believed that the flow of cooling air W1X is obstructed to some degree due to the block-shaped member 622X, and the flow of the obstructed cooling air W1X runs along the surface of the block-shaped member 622X. Accordingly, it becomes difficult that the cooling air W1X is directed toward the cover main body 623.

As apparent from the above comparison, in the present exemplary embodiment, the cover member 620 has the tapered portion 622T. As a result, it is possible to efficiently blow cooling air toward the cover member 623.

In addition, since the baffle plate 622P is provided to the cooling air introducing portion 622, the cooling air blown in any direction can be almost guided on the tapered portion 622T, and moreover, into the cover main body 623 (see symbol W2 in FIG. 17).

As described above, according to the exemplary embodiment, it is possible to efficiently blow cooling air toward the cover main body 623 even by allowing the baffle plate 622P to collect cooling air efficienly. Particularly, in the exemplary embodiment, the fan 1300, an example of the cooling air discharging portion provided to the liquid crystal projector 1100 blow off a whirlpool wind as already described above (see FIG. 1). Accordingly, in the electro-optical device encased in a mouting case, there is a possibility that the cooling air W2 blown in an irregular way as shown in FIG. 17 may be comparatively much observed. However, in the exemplary embodiment, it is possible to efficiently blow even the cooling air W2 blown in such an irregular way toward the cover main body 623 by forming the baffle plate 622P. Moreover, in the exemplary embodiment, since the baffle plate 622P is formed to surround the side 622TF of the tapered portion 622T along which cooling air runs up, the blowing of cooling air toward the cover main body 623 is more effectively performed.

Next, the cooling air passing through the cooling air introducing portion 622 in the above manner reaches the cover main body 623. Since the cover main body 623 accommodates the electro-optical device 500, and the surface 500F of the electro-optical device 500 is exposed to the outside through the window 625, the cooling air blown into as described above cools the electro-optical device 500 itself efficiently. Moreover, in the exemplary embodiment, particularly, by forming the edge of the window 625 in a tapered shape, the surface 500F of the electro-optical device 500 and the side 622TF of the tapered portion 622T are formed successively, thereby allowing the cooling effect of the electro-optical device 500 to be more efficient. That is, as indicated in FIG. 17 by reference numeral W1", the cooling air, which has ran up the side 622TF of the tapered portion 622T, is blown out of the surface 623F of the cover main body 623 formed in the window 625 and out of the surface 625F constituting the edge of the window 625 (see FIG. 7 for both of them) without its running being disturbed. As a result, the cooling air can flow into the surface 500F of the electro-optical device 500 (see reference numeral W1" in FIG. 17).

Moreover, the cooling air, which has passed through the cooling air introducing portion 622, cools the cover main body 623 or the cover member 620 as well as the above-mentioned electro-optical device 500 itself. Further, in the exemplary embodiment, particularly, since the cover main body 623 is provided with the side fin portion 627, the cover main body 623 or the cover member 620, or the electro-optical device 500 can be more efficiently cooled thanks to the surface area increasing effect of the side fin portion.

Meanwhile, the cooling air, which has passed the cover main body 623, next, reaches the cooling air discharging portion 624. The rear fin portion 624F is formed in the cooling air discharging portion 624 as described above. Since the rear fin portion 624F has straight fins and the surface area of the cooling air discharging portion 624 is increased as described above, it is possible to effectively cool the cooling air discharging portion 624 and the cover member 620. Moreover, in the exemplary embodiment, since the linear fins are formed to comply with the flow of cooling air, and the gap g2 between these linear fins is set to be 1 mm or more, the following working effects can be achieved.

First, since the rear fin portion 624F is formed to comply with the flow of cooling air, the rear fin portion 624F can naturally conduct the cooling air back to back without excessively obstructing the flow of the cooling air (see reference numeral W1" in FIG. 17). Accordingly, according to the exemplary embodiment, the cooling effect of the cover member 620 caused by the rear fin portion 624F can be effectively obtained.

In addition, as noticeable from the cooling winds W2 in FIG. 17, it is natural that there is a case that the cooling air flows in a direction, which is not necessarily aligned with the extending direction of the straight fins. Moreover, in the exemplary embodiment, the fan 1300 provided to the liquid crystal projector 1100 supplies a whirlpool wind as already described above (see FIG. 1). Therefore, strictly speaking, the direction of the cooling air is not always the straight direction toward the electro-optical device encased in the mounting case, which is the light valve 100R, 100G, or 100B. However, even though the rear fin portion 624F according to the exemplary embodiment is provided in consideration of these situations, the exemplary embodiment belongs to the case that it is provided "to comply with the flow of the cooling air" referred to in an aspect of the present invention. This is because even in aforementioned situation, most of the cooling air shown in FIG. 17 flows into the cooling air introducing portion 622, the cover main body 623, and cooling air discharging portion 624 in this order.

Like this, the construction that "the fins are provided to comply with the flow of the cooling air" according to an aspect of the present invention does not mean only the case that the fins are provided to strictly or completely comply with the flow of the cooling air. As described above, it also includes the case where the fins are provided to roughly comply with the direction of the flow of the cooling air based on the electro-optical device encased in the mounting case.

On the other hand, since the gap g2 between linear fins constituting the rear fin portion 624F is set to be 1 mm or more, the cooling air W1', as shown in FIG. 17, can easily flow between the linear fins, even though the static pressure of the cooling air W1" is low and the air quantity thereof is small. In particular, in the exemplary embodiment, the electro-optical device encased in the mounting case is provided as the light valves 100R, 100G, and 100B of the liquid crystal projector 1100 as shown in FIG. 1. Therefore, the other components, such as the incident lens 1122 and the relay lens 1123 need to be provided, so that the electro-optical device encased in the mounting case, that is, the light valves 100R, 100G, and 100B, and the fan 1300 have to be disposed a relatively long distance apart. And thus, in some cases, it is difficult to dispose both of them to completely opposite to each other. In this case, it is considered that only the cooling air having a low static pressure and a low amount are blown to the electro-optical device encased in the mounting case.

Herein, in the exemplary embodiment, since the gap g2 between the aforementioned linear fins is comparatively largely set to be 1 mm or more, it is possible to make the aforementioned cooling air having a low static pressure and a small quantity of air blown out even in the gap g2. By doing so, since the surface area of the fins that are exposed to the cooling air is increased, the characteristics on the heat dissipation of the fins can be more enhanced. Therefore, according to the exemplary embodiment, it is possible to further enhance the capability of the heat dissipation of the overall cover member 620.

Meanwhile, the above working effects can be enjoyed in generally similar way, even in case that the gap g1 between two columns of linear fins constituting the side fin portion 627 is set to be 1 mm or more.

As described above, the cover member 620 according to the exemplary embodiment is generally adapted to achieve the effective cooling in the whole cover member 620. According to this, it is meant that the flow of heat from the electro-optical device 500 via the bent portion 613 to the plate portion 610 or the cover member 620, which has been described with reference to FIG. 15, is always effectively maintained. In other words, since the cover member 620 is suitably cooled in a normal state, its function as a heat sink can be maintained at any time, and thus, the heat dissipation for the cover member 620, from the plate member 610 and moreover, from the electro-optical device 500 can be effectively performed. In addition to this, if the cover member 620 in the exemplary embodiment is made up of a material having relatively high heat conductivity, such as aluminum, magnesium, copper, or alloys thereof as described above, the aforementioned function and effect will be more effectively enhanced.

Figure 19:
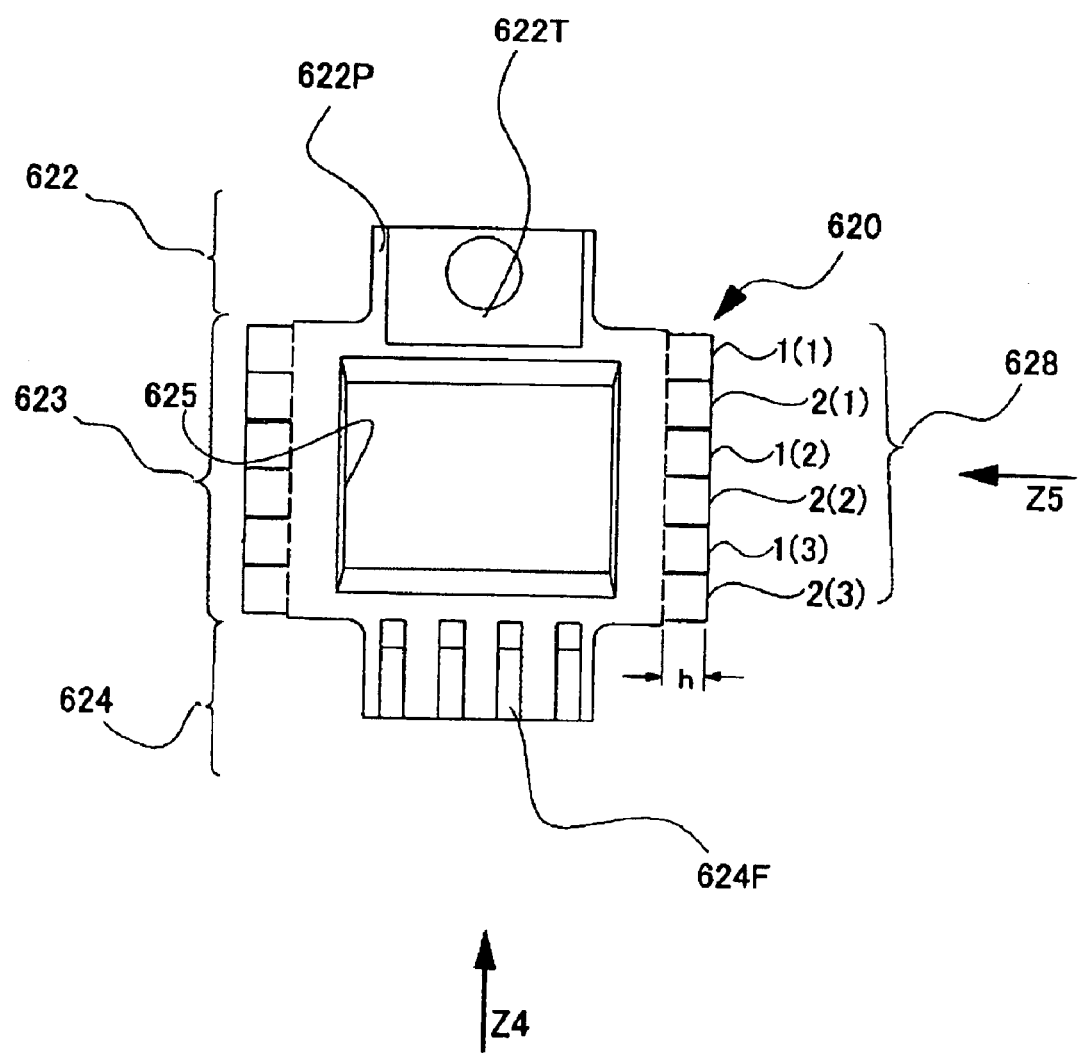
FIG. 19 is a view having the same purpose as FIG. 12 and is a front view of the cover member in which the shapes of fins formed in the cover member are different from those of the fins shown in FIG. 12.
Figure 20:
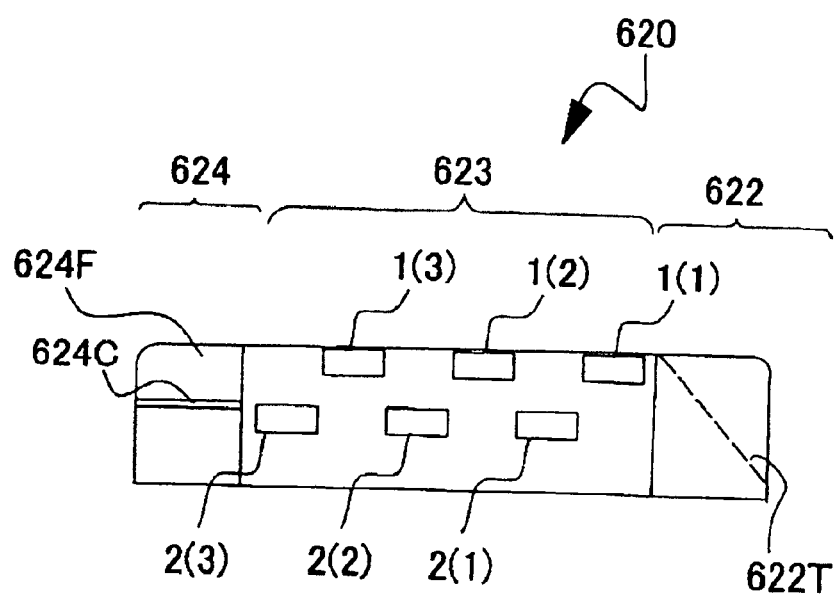
FIG. 20 is a view having the same purpose as FIG. 14 and is a front view of the cover member in which the shapes of fins formed in the cover member are different from those of the fins shown in FIG. 14.

Moreover, in the above exemplary embodiment, two columns of linear fins are formed to be juxtaposed on the side wall portion 62W of the cover member 620. However, the present invention is not limited to such an aspect. For example, an aspect as shown in FIG. 19 and FIG. 20 can be employed. Herein, FIG. 19 and FIG. 20 have a purpose similar to that of the figure FIG. 12 and FIG. 14, respectively, and illustrate a different aspect of fins formed in the side wall portion 62W.

In these FIG. 19 and FIG. 20, the side wall portion 62W of the cover main body 623 is formed with a side fin portion 628 including a plurality of small fins arranged in zigzags. More specifically, the side fin portion 628 include six small fins for every side of the cover main body 623, that is, twelve small fins for the overall cover member 620. Referring to the only one side, the side fin portion 628 include, for example, a first column of fins and a second column of fins, which are in the left and right directions in the figure, respectively, as shown in FIG. 20. In addition, the first column of fins include three small fins 1(1), 1(2), and 1(3), and the second column of fins include three small fins 2(1), 2(2), and 2(3).

Even in case of a construction having side fin portion 628 constructed as such, the cooling of the cover member 620, and the cooling of the electro-optical device 500 can be effectively achieved without a change.

Fixing Operation and Effects of an Electro-Optical Device by a Plate Member

As described above, in the exemplary embodiment, the presence of the heat transfer paths HR1, HR2, and HR3 connecting the electro-optical device 500 with the cover member 620, the effective cooling of the cover member 620, etc., allows the effective cooling of the electro-optical device 500 to be achieved. However, in some cases, the cover member 620 may accumulate heat excessively. Moreover, in case that the cover member 620 employs an aspect made of a high heat conductivity of material, such as aluminum as described above, in order to further raise the heat conductivity in the cover member 620 itself, it shall be considered that the cover member 620 thermally expands comparatively largely because such material may often include a comparatively large coefficent of linear expansion of material.

However, in the exemplary embodiment, there is no fear of suffering any particular inconvenience even in the above case. This is because the roll sharing between the cover member 620 and plate member 610 according to the exemplary embodiment is achieved. That is, the cover member 620 mainly shares a function to cool the electro-optical device 500, while the plate member 610 mainly shares a function to reduce or prevent any dislocation of the electro-optical device 500 in the mounting case 601. The former is as already described in detail with reference to FIG. 17, etc. The latter is as follows.

First, the plate member 610 is provided with, to fix the electro-optical device 500, the bent portion 613, the strength reinforcement portion 614, and the double coated adhesive tape 1. That is, firstly, according to the bent portion 613, the second facing surface 613F2 of the bent portion 613 abuts against the outer surface of the electro-optical device 500, thereby constraining the installation position of the electro-optical device 500 to some degree. In particular, in the exemplary embodiment, the bent portion 613 is formed such that a part of each of two opposed sides of a generally quadrilateral shape forming a schematic feature of the plate member 610 is bent toward the inside of the quadrilateral shape. Thus, since the contact area between the plate member 610 and the electro-optical device 500 is comparatively increased, and the electro-optical device 500 can be comparatively stably located on the plate member 610, it is possible to obtain the working effect of positioning the electro-optical device by the plate member. Secondly, since the strength reinforcement portion 64 is formed as if it substantially contacts with one side of the electro-optical device 500, according to the strength reinforcement portion 614, the installation position of the electro-optical device 500 is constrained to some degree. Thirdly, regarding the double coated adhesive tape 1, the adhesiveness with the double coated adhesive tape 1 constrains the installation position of the electro-optical device 500.

As opposed to this, to fix the electro-optical device 500, only the double coated adhesive tape 2 exists in the cover member 620 basically.

As thus described, in the exemplary embodiment, the plate member 610 carries a function to reduce or prevent any dislocation of the electro-optical device 500 in the mounting case 601.

In this regard, if the cover member 620 according to the exemplary embodiment is constructed to have a function to reduce or prevent any dislocation of the electro-optical device 500, large thermal expansion of the cover member 620 causes the electro-optical device 500 to be displaced. Thus, there is a high possibility of causing any dislocaiton of the electro-optical device 500 in the mounting case 601.

However, in the exemplary embodiment, since the role sharing between the plate member 610 and the cover member 620 is achieved as described, the above-mentioned inconvenience does not occur. That is, since the cover member 620 mainly does not carry a function to fix the electro-optical device 500, comparatively free heat deformation is allowed. Further, since the plate member 610 mainly does not carry a function to cool an electro-optical device, it is possible to make the plate member carry a function to fix an electro-optical device more safely.

Figure 21:
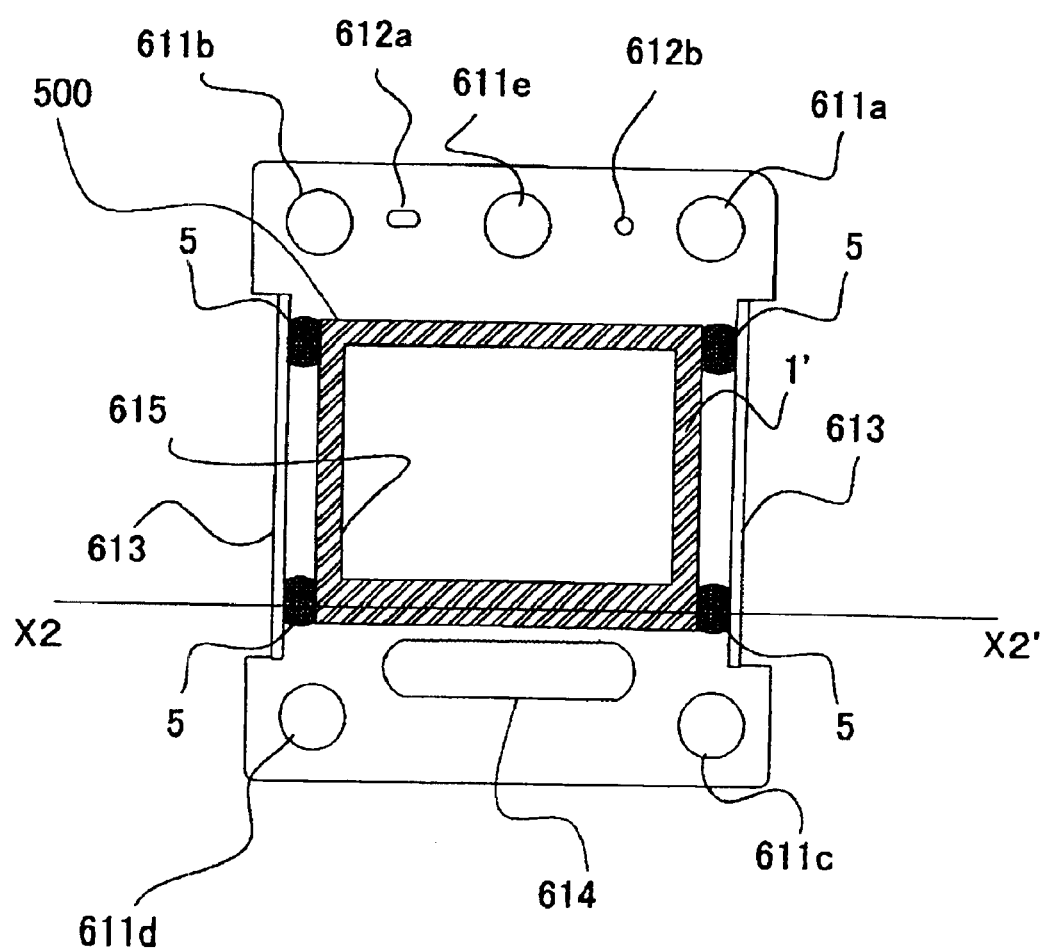
FIG. 21 is a view having the same purpose as FIG. 9, and shows an aspect of fixing the electro-optical device using the photo-curing resin.
Figure 22:
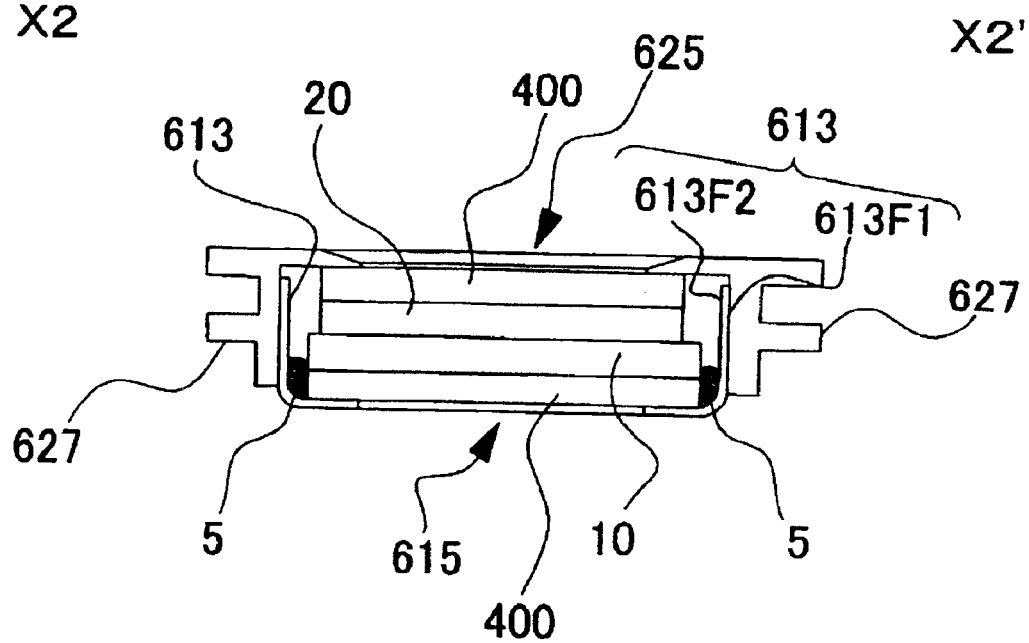
FIG. 22, having the same purpose as FIG. 6, shows an aspect of fixing the electro-optical device using the photo-curing resin, and corresponds to the line sectional view along the plane X2—X2 of FIG. 21, not to the line sectional view along the plane X1–X1' of FIG. 5.

Moreover, in an aspect of the present invention, as a construction to fix the electro-optical device 500 by the plate member 610, any construction other than the above-mentioned one can be employed. Specifically, a fixing construction as shown, for example, in FIG. 21 and FIG. 22, can be employed. Herein, FIG. 21 is a plan view, for the purpose similar to that of FIG. 9, of the front of the plate member 610, illustrating a construction in which the plate member 610 and the electro-optical device 500 installed in the plate member 610 are fixed to each other using photo-curing resin therebetween. Further, FIG. 22 is a sectional view, for the purpose similar to that of FIG. 6, of an electro-optical device encased in the mounting case, illustrating a construction in which the plate member 610 and the electro-optical device 500 are fixed to each other with photo-curing resin therebetween. Here, in order to show the photo-curing resin, FIG. 22 is a cross-sectional view taken along the plane X2–X2' (see FIG. 21) different from the plane X1–X1' of FIG. 5.

These figures, first, are different from each other in that a molding material 1' instead of the double coated adhesive tape 1, is provided in the location where the double coated adhesive tape 1 has been provided hitherto. That is, the molding material 1' is coated to bury the whole peripheral region of an electro-optical device 500. As a result, the fixation of the electro-optical device 500 by the plate member 610 is achieved (in addition, in FIG. 21, it may be considered that the contour of the molding material 1' corresponds to that of the electro-optical device 500). Thus, in an aspect of the present invention, the double coated adhesive tape 1 and the molding material 1' can be substituted mutually. Meanwhile, this is applied to the double coated adhesive tape 2 (see FIG. 5 and FIG. 7), in other words, molding material (not shown) may be provided instead of the double coated adhesive tape 2.

Also, in FIG. 21 and FIG. 22, particularly, photo-curing resin 5 is provided between the side of electro-optical device 500, and a surface, which faces one surface of the electro-optical device 500 in the plate member 610. More specifically, the photo-curing resin 5 is provided to correspond to four corners of the electro-optical device 500. Further, in each of these four corners, the photo-curing resin 5 is located between the above mentioned surfaces of the electro-optical device 500 and the plate member 610, and the inner surface of the bent portion 613, i.e., the second facing surface 613F2 of the bent portion 613.

In the fixing construction as described, the electro-optical device 500 is constrained with the bent portion 613, the strength reinforcement portion 614, etc., and is fixed with the molding material 1' or the photo-curing resin 5 which can exhibit a comparatively strong fixing effect. Accordingly, according to the exemplary embodiment, it is possible to obtain a fixing effect to the same degree as or greater degree than that of the aforementioned fixing construction. Moreover, in FIG. 21, particularly, although the photo-curing resin 5 is provided to correspond to the four corners of the electro-optical device 500, the amount of consumption of the photo-curing resin can be saved, and the electro-optical device 500 can be uniformly fixed.

Moreover, in such a construction, as described above, the photo-curing resin 5 exhibiting comparatively strong fixing effect is provided. Thus, the molding material 630, which has been provided hitherto, is not necessarily required. Accordingly, the provision of the molding material 630 can be omitted as shown in FIG. 22.

The present invention is not limited to the aforementioned exemplary embodiments, but it can be modified without departing from the scope and spirit of the present invention. The modified electro-optical device encased in the mounting cases, projection display apparatuses, and mounting cases also belong to the technical scope of the present invention. The electro-optical device includes, for example, an electrophoresis apparatus, an electroluminescent apparatus, a plasma display apparatus, and an apparatus, such as a field emission display apparatus, and a surface-conduction electron-emitter display apparatus using an electron-emitting device as well as a liquid crystal panel.

What is claimed is:

1. An electro-optical apparatus, including:

an electro-optical device having an image display region on which projection light from a light source is incident; and a mounting case having a plate disposed so as to face one surface of the electro-optical device, and a cover to cover the electro-optical device, the cover having a first abutting portion abutting against the plate, the mounting case accommodating the electro-optical device by holding at least a part of a peripheral region located at a circumference of the image display region of the electro-optical device with at least one of the plate and the cover, at least one of a heat transfer path reaching the cover from the electro-optical device through the plate and another heat transfer path reaching the cover from the electro-optical device not through the plate being formed, and the heat transfer path including a portion in which the electro-optical device area contacts with the plate, directly or indirectly.

2. The electro-optical apparatus according to claim 1, the heat transfer path including a portion in which the electro-optical device area contacts with the cover, directly or indirectly.

3. The electro-optical apparatus according to claim 1, the cover being made of a material having a higher heat conductivity than the plate, and also the electro-optical device is fixed to the plate.

4. The electro-optical apparatus to claim 1, a molding material being interposed between the plate and the electro-optical device, and the heat transfer path including the molding material.

5. The electro-optical apparatus according to claim 1, the plate and the electro-optical device being bonded to each other by a photo-curing resin.

6. The electro-optical apparatus according to claim 1, the area-contacted portions being bonded to each other by at least one of a double coated adhesive tape and a molding material.

7. The electro-optical apparatus according to claim 6, at least one of the double coated adhesive tape and molding material being made of a material whose heat conductivity is 0.6 W/m·K or more.

8. The electro-optical apparatus according to claim 1, the plate being made of a plate-shaped member, and including a rising portion rising toward the cover from the panel member, and having a second abutting portion abutting against at least a part of the electro-optical device, directly or indirectly, and the area-contacted portion including the rising portion.

9. The electro-optical apparatus according to claim 8, the rising portion including a bent portion having a part of the plate-shaped member which is bent.

10. The electro-optical apparatus according to claim 9, the plate-shaped member including a quadrilateral portion in plan view, and the bent portion being formed so that a part of two facing sides among the individual sides constituting the quadrilateral shape including a portion bent into the quadrilateral portion.

11. The electro-optical apparatus according to claim 8, the cover including a wall portion facing a side of the electro-optical device, and the first abutting portion including an abutting portion between the first facing surface of the rising portion and at least a part of the wall portion.

12. The electro-optical apparatus according to claim 11, the second abutting portion including an abutting portion between the second facing surface as the rear surface of the first facing surface and at least a part of a side of the electro-optical device.

13. The electro-optical apparatus to claim 8, the rising portion rising at a right angle from the plate-shaped portion.

14. The electro-optical apparatus according to claim 1, the plate having a coefficient of linear expansion within a predetermined range when the coefficient of linear expansion of the substrate constituting the electro-optical device is a standard.

15. The electro-optical apparatus according to claim 14, the predetermined range being $\pm 5 \times 10-6/^\circ$ C.

16. The electro-optical apparatus according to claim 14, the plate being made of an alloy including at least iron and nickel.

17. The electro-optical apparatus according to claim 14, the substrate having at least one of a pair of substrates interposing an electro-optical material and dustproof substrates provided on the pair of substrates not facing to the electro-optical material.

18. The electro-optical apparatus according to claim 1, the cover including surface-area increasing portion increasing the surface area.

19. The electro-optical apparatus according to claim 18, the surface area increasing portion including at least one of a fin formed so as to protrude from the surface of the cover and a dimple formed so as to form a concave portion on the cover.

20. The electro-optical apparatus according to claim 19, the fins being formed to correspond to the direction of the flow of cooling air which is supplied to the electro-optical device.

21. The electro-optical apparatus according to claim 19, the fins including the first column of fins and the second column of fins extending in parallel with the first column of fins, and a gap between the first column of fins and the second column of fins being 1 mm or more.

22. The electro-optical apparatus according to claim 1, the cover including a cover main body accommodating the electro-optical device and a cooling air introducing portion extended from or added along the cover main body, and the cooling air introducing portion including a cooling air scattering prevention portion causing the cooling air sent toward the electro-optical device encased in the mounting case to flow to the cover main body.

23. The electro-optical apparatus according to claim 22, the cooling air scattering prevention portion including a baffle plate.

24. The electro-optical apparatus according to claim 22, the cooling air introducing portion including a slope portion having a pointed shape, a tip thereof opposing to the flow direction of the cooling air, the cooling air scattering prevention portion including the slope portion.

25. The electro-optical apparatus according to claim 24, the baffle plate being formed to surround the surface constituting the slope portion.

26. The electro-optical apparatus according to claim 1, the cover including a cooling air introducing portion, and the cooling air introducing portion including a cooling air guiding portion causing the cooling air sent toward the electro-optical device encased in the mounting case to flow to the cover main body.

27. A projection display apparatus, comprising:

an electro-optical apparatus according to claim 1;

the light source;

an optical system to guide the projection light into the electro-optical device; and a projection optical system to project the light emitted from the electro-optical device.

28. A mounting case, comprising:

a plate disposed so as to face one surface of an electro-optical device in which the light emitted from a light source is incident on an image display region; and a cover to cover the electro-optical device, the cover having a first portion of abutting against the plate, the mounting case accommodating the electro-optical device by holding at least a portion of a peripheral region located at the circumference of an image display region of the electro-optical device with at least one of the plate and the cover, and at least a heat transfer path being provided from the electro-optical device to the cover through the plate, and the heat transfer path including a portion in which the electro-optical device area contacts with the plate, directly or indirectly.

29. The mounting case according to claim 27, the cover being made of a material having a higher heat conductivity than the plate, and also the electro-optical device is fixed to the plate.

* * * * *